United States Patent
Nakashima et al.

(10) Patent No.: US 7,513,329 B2
(45) Date of Patent: Apr. 7, 2009

(54) VEHICLE REAR BODY STRUCTURE

(75) Inventors: Akira Nakashima, Wako (JP); Takeshi Aoki, Wako (JP); Hiroyuki Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 11/366,176

(22) Filed: Mar. 2, 2006

(65) Prior Publication Data

US 2006/0197300 A1 Sep. 7, 2006

(30) Foreign Application Priority Data

| Mar. 2, 2005 | (JP) | ............................. 2005-057649 |
| Mar. 2, 2005 | (JP) | ............................. 2005-057819 |
| Mar. 15, 2005 | (JP) | ............................. 2005-073531 |

(51) Int. Cl.
*B62D 21/11* (2006.01)
*B62D 21/15* (2006.01)

(52) U.S. Cl. ............................. 180/312; 280/124.109; 280/788; 280/784; 296/187.11; 296/193.02

(58) Field of Classification Search ................ 180/311, 180/312; 280/124.109, 788, 784; 296/187.03, 296/187.08, 187.11, 203.01, 203.04, 205, 296/193.02, 24.43, 204
See application file for complete search history.

(56) References Cited

U.S. PATENT DOCUMENTS

| 5,085,484 | A | * | 2/1992 | Mori ........................... 296/204 |
| 5,580,121 | A | * | 12/1996 | Dange et al. ............. 296/181.4 |
| 5,788,322 | A | * | 8/1998 | Wolf et al. ............... 296/181.4 |
| 6,113,180 | A | * | 9/2000 | Corporon et al. ........ 296/203.04 |
| 7,040,432 | B2 | * | 5/2006 | Kawasaki et al. .......... 180/65.1 |
| 7,325,865 | B2 | * | 2/2008 | Yamazaki .............. 296/203.04 |
| 2004/0155449 | A1 | * | 8/2004 | Hashimura .................. 280/785 |
| 2005/0073174 | A1 | * | 4/2005 | Yamaguchi et al. ..... 296/203.04 |
| 2005/0082879 | A1 | * | 4/2005 | Goto et al. .................. 296/204 |

FOREIGN PATENT DOCUMENTS

JP 2003-291857 10/2003

* cited by examiner

*Primary Examiner*—Ruth Ilan
(74) *Attorney, Agent, or Firm*—Rankin, Hill & Clark LLP

(57) ABSTRACT

A vehicle rear body structure includes a support frame of generally rectangular shape attached to side frames of a vehicle body from below for supporting thereon a vehicle part including a fuel tank. The support frame is connected at a front end thereof to floor frames disposed inwardly of the side frames and extending along front parts of the side frames and, at a rear end thereof, to rear frames forming rear parts of the side frames.

24 Claims, 16 Drawing Sheets

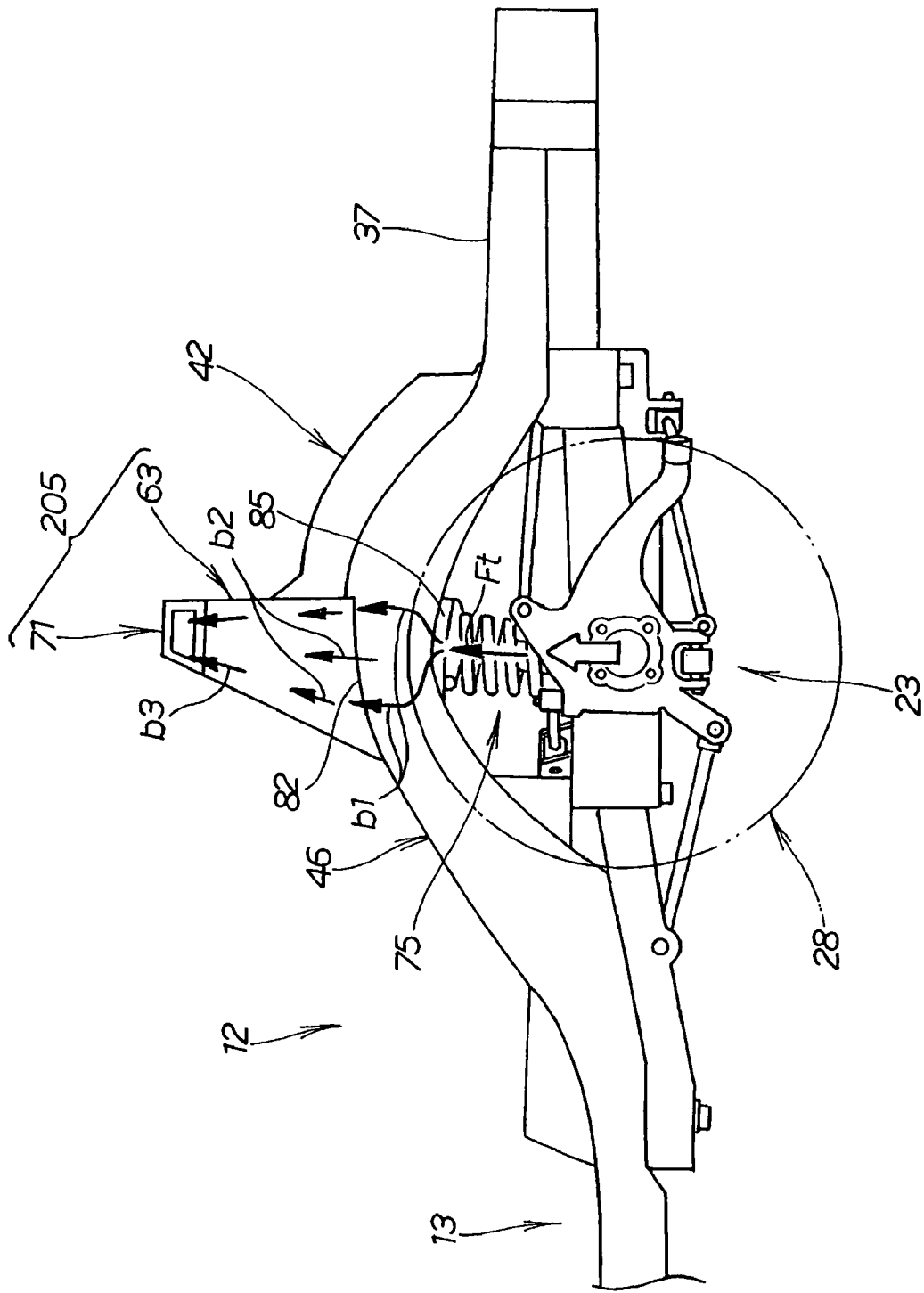

VEHICLE REAR BODY STRUCTURE

FIELD OF THE INVENTION

The present invention relates generally to a rear body structure for a vehicle, and more particularly to a vehicle rear body structure including a support frame for supporting thereon rear suspension units and a fuel tank.

BACKGROUND OF THE INVENTION

Vehicle rear body structures of the type concerned are known as disclosed, for example, in Japanese Patent Laid-open Publication (JP-A) No. 2003-291857. The disclosed vehicle rear body structure, as shown in FIGS. 16A and 16B hereof, includes left and right side frames 302, 303 extending in a longitudinal direction of a vehicle body 301, left and right floor frames 304, 305 disposed between and extending alongside respective front parts (side sills) of the side frames 304, 305, and a support frame 308 of generally rectangular shape attached to respective rear parts (rear frames) 306, 307 of the side frames 302, 303 from below for supporting thereon left and right rear suspension units 309, 309 and fuel tanks (hydrogen tanks) 311, 312.

The rear frames 306, 307 have a hollow structure and include channel-shaped rear brackets 313, 314 attached to the undersides of respective rear portions of the rear frames 306, 307 for absorbing an impact applied to a rear bumper beam attached to rear ends of the rear brackets 313, 314. The support frame 308 has a rear end 316 connected by bolts 319, 319 to the rear brackets 313, 314 and a front end 318 connected by bolts 320, 320 to front end portions of the rear frames 306, 307. The bolts 319, 319 are tightly threaded in collar nuts 321 welded at lower ends to bottom walls of the channel-shaped rear brackets 313, 314, and the bolts 320, 320 are tightly threaded in similar collar nuts 321 welded at lower ends to bottom walls 322 of the front end portions 317, 317 of the rear frames 306, 307.

When the vehicle rear body structure 301 of the foregoing construction is subjected to an impact force applied to the rear bumper beam 315 from behind, the impact force is transmitted through the rear brackets 313, 314 and the rear frames 306, 307 to the side sills of the side frames 302, 303 and also to the floor frames 304, 305, as indicated by arrows a1, a2, a3 and a4 shown in FIG. 16B. In this instance, the rear brackets 313, 314 and the rear frames 306, 307, as they take up or absorb the impact force, may undergo great plastic deformation at central portions thereof where the rear suspension units 309, 309 are disposed. Furthermore, since the support frame 308 is connected at the rear end to the rear brackets 313, 314 and, at the front end, to the front end portions of the side sills of the side frames 302, 303, the bottom walls 322 of the front end portions of the side sills are susceptible to deformation or bending due to stress concentration occurring at weld joints between the bottom walls 322 and the collar nuts 321.

To deal with this problem, one may consider an arrangement in which the vertical position of the support frame 308 is shifted upward to the extent that the support frame 308 is partially incorporated in the front end portions 317, 317 of the rear frames 306, 307. In this arrangement, however, since the front end portions 317, 317 of the rear frames 306, 307 have a step-like configuration, the rear frames 306, 307 are likely to deform or bend at central portions thereof due to bucking occurring at the step-like front end portions 317, 317 when the vehicle is subjected to a rear-end collision.

Another problem associated with the known vehicle rear body structure 301 is that the rear frames 306, 307 are likely to undergo undue elastic deformation when subjected to a large upward thrust applied from struts of the rear suspension units 309, 309 through strut housings (not shown) provided on the rear frames 306, 307 for supporting upper ends 323, 323 of the struts.

As shown in FIG. 16A, the hydrogen tanks 311, 312 are disposed in a space defined below a floor panel 324 so that a passenger compartment provided above the floor panel 324 is isolated from hydrogen leakage that may occur in the tank receptacle space. As for the passenger compartment isolation structure, further improvements in the reliability of isolation performance are still desired.

SUMMARY OF THE INVENTION

In one aspect the invention provides a vehicle rear body structure comprising: left and right side frames laterally spaced from each other and extending in a longitudinal direction of a vehicle body, each of the side frames including a rear frame extending along a rear part of the vehicle body and a side sill contiguous with and extending forwardly from a front end of the rear frame; left and right floor frames disposed between the left and right side frames and each extending alongside a respective one of the side sills of the side frames; and a support frame of generally rectangular shape attached to the side frames from below for supporting thereon a vehicle part, the support frame having a front end connected to the floor frames and a rear end connected to the rear frames.

By virtue of the support frame connected at the front end to the floor frames, a force applied to the support frame from behind is transmitted from the front end of the support frame to the floor frames. This arrangement reduces force or load applied to the rear frames, leading to an improvement in the rigidity of the vehicle body.

Preferably, the vehicle rear body structure further includes a cross member extending transversely between and interconnecting the front ends of the rear frames. The floor frames have rear end portions connected to the cross member, and the front end of the support frame is connected to the floor frames at junctions between the floor frames and the cross member. This arrangement ensures that the force applied to the support frame from behind is directly transmitted to the floor frames and the cross member. By thus distributing the force, it is possible to increase the rigidity of the vehicle rear body structure.

The vehicle rear body structure may further include a collar disposed between each of the rear end portions of the floor frames and the cross member, and a bolt extending successively through the front end of the support frame and the collar and being threaded in the cross member so that the front end of the support frame, the rear end portion of each floor frame and the cross member are tightly fastened together. With this arrangement, the collar serves to provide an axial tension to the bolt, so that the front end of the support frame, the rear end portion of the floor frame and the cross member are tightly fastened together. By thus forming a joint structure, it is possible to increase the rigidity of the vehicle body.

Preferably, the generally rectangular support frame includes a central attachment portion disposed intermediately between the front end and the rear end of the support frame and connected to each of the rear frames. The vehicle part supported on the support frame comprises a fuel tank disposed between the central attachment portion and the rear end of the support frame. The central attachment portion thus provided can increase a fastening strength between the support frame and the rear frames. It is therefore possible to increase the size or capacity of the fuel tank and further place a capacitor between the central attachment portion and the front end of the support frame.

In one preferred form of the invention, a rear frame lower member is connected to an under side of a rear portion of each of the rear frames and extends longitudinally along the rear portion of each rear frame. The rear frame lower member has a front end disposed face-to-face with and in proximity to the rear end of the support frame. With the rear frame lower member thus provided, a force applied to a rear end of the vehicle body from behind is distributed into the rear frames and the rear frame lower members. By thus distributing the force, it is possible to increase the rigidity of the vehicle body at a rear-end collision.

Preferably, the vehicle rear body structure further includes a rear bumper attached to rear ends of the rear frames and extending in a widthwise direction of the vehicle body, and a bumper beam lower member attached to an under side of the rear bumper beam at a portion corresponding in position to the rear frame lower member. With this arrangement, an impact force applied to the rear bumper beam is transmitted from the bumper beam lower member to the corresponding rear frame lower member and thence to the support frame. The rear bumper beam has a central portion devoid of the bumper beam lower member so that the overall weight of the rear bumper beam is relatively small.

The vehicle rear body structure preferably includes a bracket attached to the front end of the rear frame lower member and the rear end of the support frame to thereby connect together the rear frame lower member and the support frame. The bracket thus provided ensures reliable transmission of force from the rear frame lower member to the support frame. Furthermore, by virtue of the space provided between the front end of the rear frame lower member and the rear end of the support frame, it is possible to take up or accommodate accumulated dimensional tolerances of the rear frame lower member and the support frame in the longitudinal direction of the vehicle body. This facilitates easy assembling of the support frame and the rear frames.

The support frame preferably has a displacement control portion disposed on the rear end thereof for preventing the front end of the rear frame lower member from displacing in a widthwise direction of the vehicle body beyond a predetermined range. In one preferred form, the displacement control portion comprises a pair of ribs spaced in the widthwise direction of the vehicle body and projecting from the rear end of the support frame such that distal end portions of the ribs are disposed on opposite outer sides of the front end of the rear frame lower member. By virtue of the displacement control portion, it is possible to keep the front end of the rear frame lower member and the rear end of the support frame in abutment with each other during rear-end collision, ensuring reliable transmission of the impact force from the rear frame lower member to the support frame.

The vehicle rear body structure may further include a suspension unit including a shock absorber having an upper end connected to a respective one of the rear frames, a cross member disposed above the suspension unit and interconnecting left and right rear fenders of the vehicle body, and a box member disposed between each of the rear frames and the cross member. The cross member is connected to each of the rear frames via the box member. With this arrangement, a severe upward thrust applied from a wheel through the shock absorber to each rear frame is transmitted to the box member, thence to the cross member from which the upward thrust is transmitted to the rear fenders of the vehicle body. During such transmission, the upward thrust is gradually reduced.

Preferably, each of the rear frames has an arch-shaped portion bent upward and having an attachment portion disposed on an underside of the arch-shaped portion in vertical alignment with an apex of the arch-shaped portion for attachment of the upper end of the shock absorber. With this arrangement, it is no longer necessary to provide an attachment portion projecting in a cantilevered fashion from the rear frame, which leads to a reduction in strength of a rear frame portion including such attachment portion.

The vehicle rear body structure may further include a partition wall configured to separate a passenger compartment and a tank chamber in which a fuel tank is disposed. The box member has a portion forming at least part of the partition wall. By thus providing the partition wall, it is possible to prevent a fuel gas from flowing from the tank chamber into the passenger compartment when fuel gas leakage from the fuel tank occurs. The box member forming a part of the partition wall contributes to the reduction of weight of the partition wall.

Preferably, the partition wall is connected to the cross member and the rear frames. With this arrangement, the rear frames are reinforced against force of thrust applied from the wheels through the shock absorbers.

The partition wall preferably forms a part of a seatback frame of a rear seat. This arrangement contributes to weight reduction of the vehicle body.

In another aspect the invention provides a vehicle rear body structure comprising: left and right side frames laterally spaced from each other and extending in a longitudinal direction of a vehicle body, each of the side frames including a rear frame extending along a rear part of the vehicle body; a support frame of generally rectangular shape attached to the rear frames from below for supporting thereon a vehicle part; and a rear frame lower member connected to an under side of a rear portion of each of the rear frames and extending longitudinally along the rear portion of each rear frame, the rear frame lower member having a front end disposed face-to-face with and in proximity to a rear end of the support frame.

With this arrangement, since an impact force applied to the vehicle body from behind is distributed into the rear frames and the support frame, it is possible to increase the rigidity of the vehicle body at a rear-end collision.

In still another aspect the invention provides a vehicle rear body structure comprising: left and right side frames laterally spaced from each other and extending in a longitudinal direction of a vehicle body, each of the side frames including a rear frame extending along a rear part of the vehicle body; a suspension unit including a shock absorber having an upper end connected to a respective one of the rear frames; a cross member disposed above the suspension unit and interconnecting left and right rear fenders of the vehicle body; and a box member disposed between each of the rear frames and the cross member, the cross member being connected to each of the rear frames via the box member.

With this arrangement, a severe upward thrust applied from the shock absorber to each rear frame during traveling of the vehicle is transmitted to the rear fenders successively through the box member and the cross member. During such transmission, the upward thrust is considerably reduced. The cross member and the box members together form a reinforcement of the rear frames, leading to an increase in the rigidity of the vehicle body.

BRIEF DESCRIPTION OF THE DRAWINGS

One preferred embodiment of the present invention will hereinafter be described in detail, by way of example only, with reference to the accompanying drawings, in which:

FIG. 15 is a diagrammatical side view illustrative of the manner in which a force is transmitted from the suspension device is transmitted to the reinforced rear part of the vehicle rear body structure;

DETAILED DESCRIPTION OF THE PREFERRED EMBODIMENT

Figure 1:
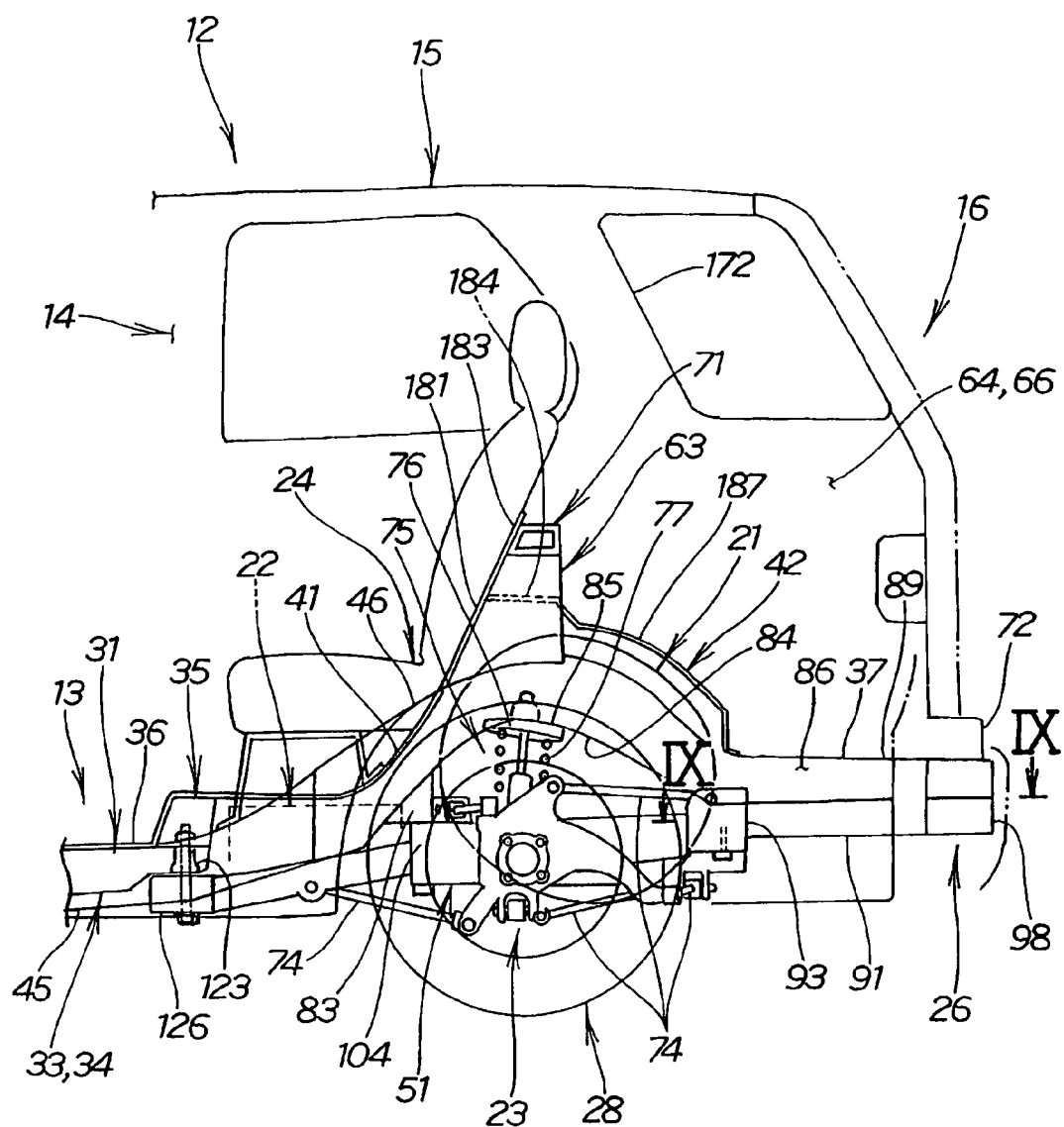
FIG. 1 is a diagrammatical side view showing a vehicle body part including a vehicle rear body structure according to an embodiment of the present invention.

Referring to FIG. 1, there is shown a rear part of a vehicle body 12 including a rear body structure according to an embodiment of the present invention. The vehicle body 12 generally includes an under body 13, left and right side bodies 14 (only the right side body being shown), a roof 15, and a rear body 16 that are assembled together into a hollow box-like structure. The under body 13 constitutes a main portion of the rear body structure according to the invention. In FIG. 1, reference numeral 21 denotes a fuel tank (hydrogen tank); 22, a capacitor disposed forwardly of the fuel tank 21; 23, a rear suspension unit; 24, a rear seat; 26, a rear bumper beam; and 28, a rear wheel.

Figure 2:
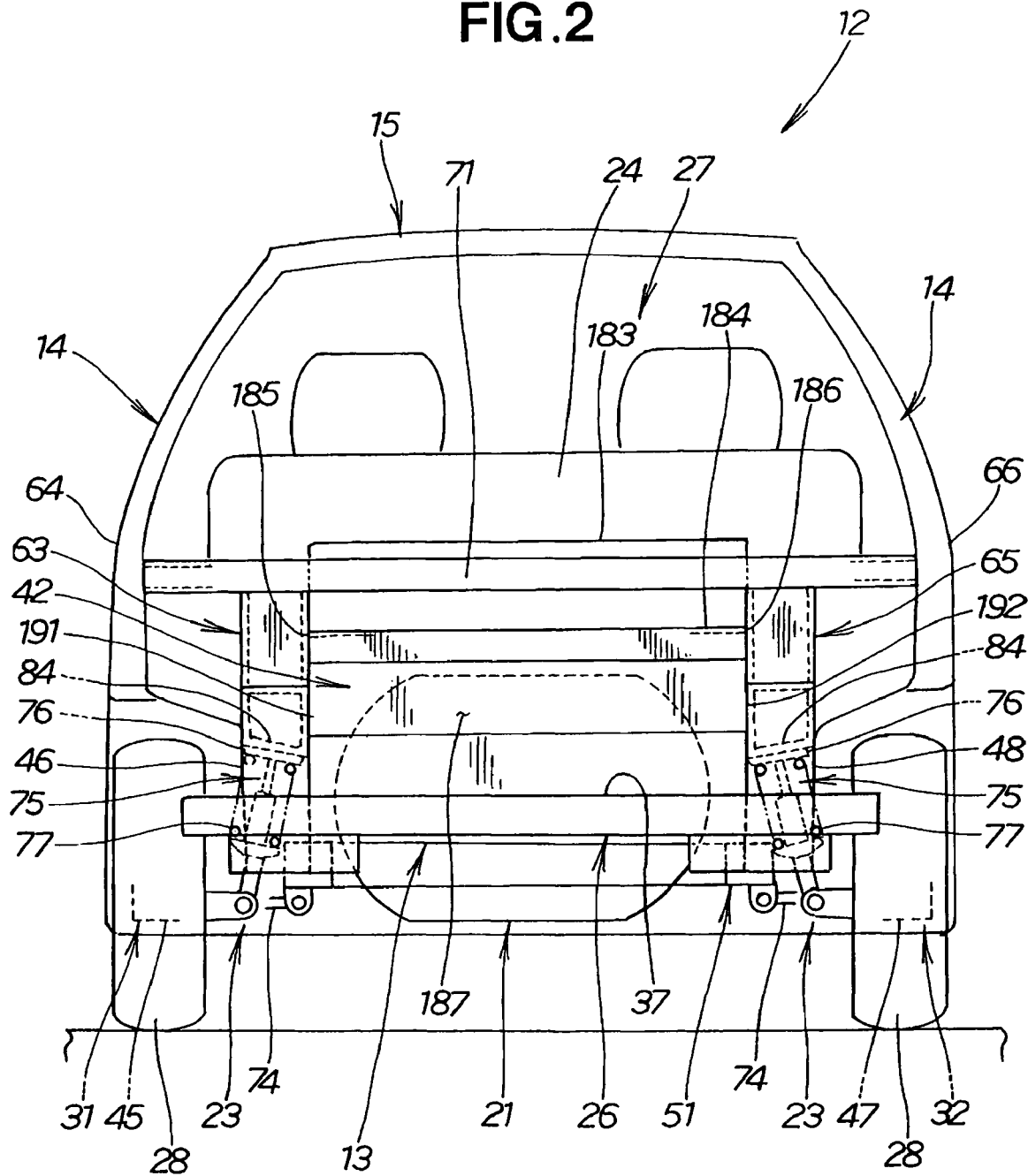
FIG. 2 is a rear view, with parts removed for clarity, of FIG. 1.
Figure 3:
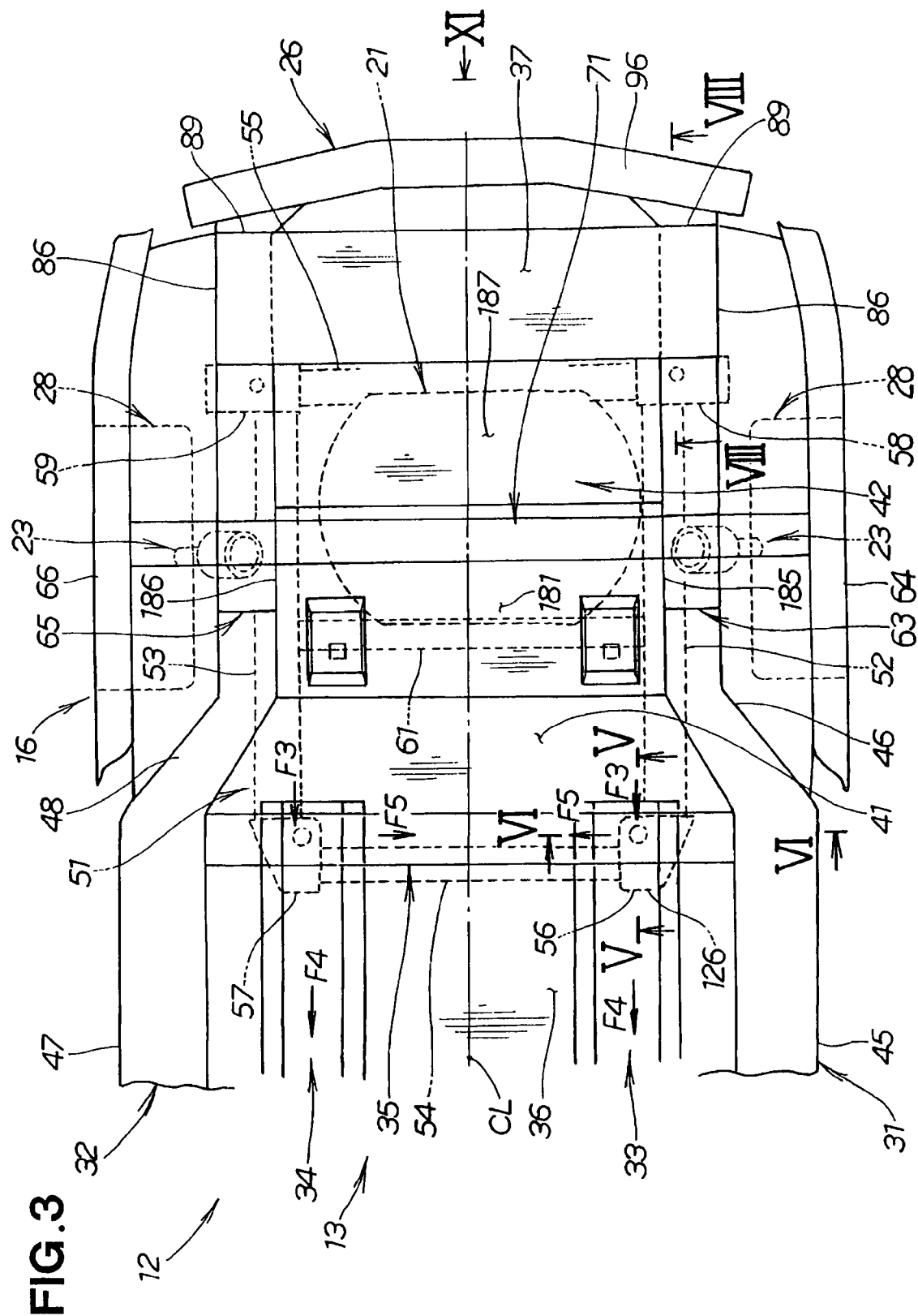
FIG. 3 is a plan view, with parts removed for clarity, of FIG. 1.

As shown in FIGS. 1 to 3, the under body 13 generally comprises left and right side frames 31, 32 laterally spaced from each other and extending in a longitudinal direction of the vehicle body 12, left and right floor frames 33, 34 disposed between the left and right side frames 31, 32 and each extending alongside a respective one of the side frames 31, 32, a middle floor cross member 35 extending transversely between the left and right side frames 31, 32 and disposed on rear end portions of the left and right floor frames 33, 34, a front floor 36 mounted to the left and right floor frames 33, 34 and the middle floor cross member 35, and a rear floor 37 mounted on respective rear parts of the left and right side frames 31, 32. A partition wall 42 extends between a seat frame 41 of the rear seat 24 and the rear floor 37 for a purpose described later.

The left side frame 31 includes a side sill 45 forming a front part of the left side frame 31, and a rear frame 46 contiguous with and extending rearward from a rear end of the side sill 45. The rear frame 46 forms a rear part of the side frame 31 and extends along a rear part of the vehicle body 12. The side sill 45 is contiguous with and extends forward from a forward end of the rear frame 46.

Similarly, the right side frame 32 includes a side sill 47 forming a front part of the right side frame 32, and a rear frame 48 contiguous with and extending rearward from a rear end of the side sill 47. The rear frame 48 forms a rear part of the side frame 32 and extends along a rear part of the vehicle body 12. The side sill 47 is contiguous with and extends forward from a forward end of the rear frame 46. The left side frame 31 and the right side frame 32 are symmetrical with each other with respect to a longitudinal centerline CL (FIG. 3) of the vehicle body 12.

The vehicle rear body structure further includes a support frame 51 of generally rectangular shape mounted to undersides of the side frames 31, 32. As shown in FIG. 3, the support frame 51 includes left and right longitudinal beam members 52, 53, front and rear transverse beam members 54, 55, and four corner members 56 to 59 that are connected together into a rectangular framework configuration so that the corner members 56-59 are disposed at respective corners of the rectangular support frame 51. The support frame 51 further includes a central transverse beam 61 extending crosswise between the left and right longitudinal beams 52, 53 at longitudinal central portions of the longitudinal beams 52, 53.

As shown in FIG. 2, the left rear frame 46 is connected to a left rear fender 64 via a box member 63. The box member 63 is mounted to the left rear frame 46. Similarly, the right rear frame 48 is connected to a right rear fender 66 via a box member 65 mounted to the rear frame 48. The rear body 16 includes a parcel frame 71 extending transversely between the left and right rear fenders 64, 66, and a rear end panel 72 closing a rear end of the vehicle body 12.

The suspension unit 23 is associated with each of the rear wheels 28. The suspension unit 23 is connected to the support frame 51 by means of a plurality of rods 75 and includes a shock absorber 75 having an upper end 76 directly connected to each of the left and right rear frames 46, 48, and a coil spring 77 wrapped around the shock absorber for supporting excess weight when the vehicle carries heavy loads.

Figure 4:
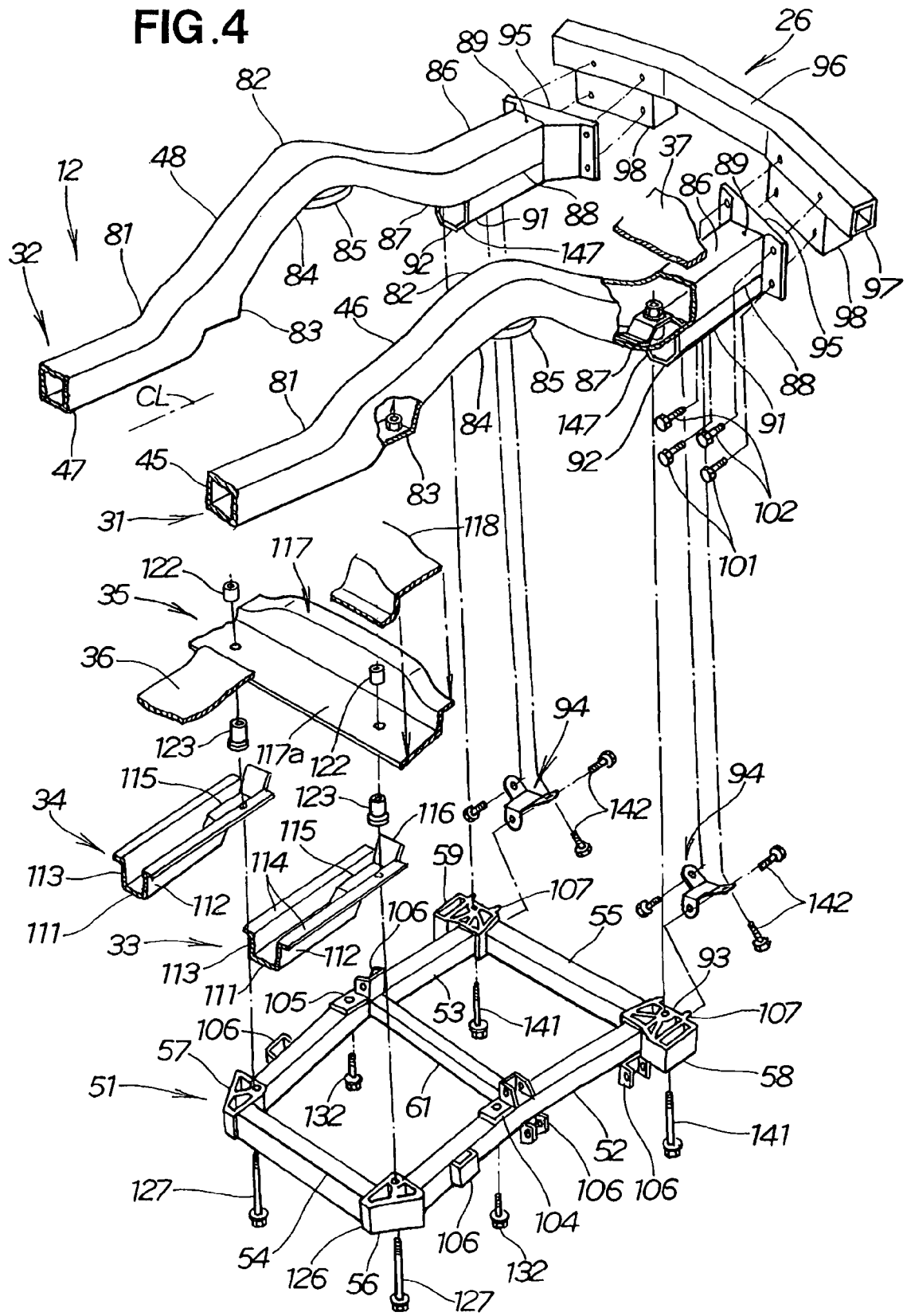
FIG. 4 is an exploded perspective view of the vehicle rear body structure.

As shown in FIG. 4, the left and right side frames 31, 32 have a hollow structure, and as previously described, these side frames 31, 32 are disposed symmetrically with each other with respect to the longitudinal centerline CL of the vehicle body 12. The left and right rear frames 46, 48 are identical in structure and each have a front portion 81 contiguous with and extending rearward from a rear end of the left side sill 45, an arch-shaped central portion 82 contiguous with and extending rearward from a rear end of the front portion 81, and a rear portion 86 contiguous with and extending rearward from a rear end of the arch-shaped central portion 82. The arch-shaped central portion 82 is curved or bent upward. The left rear frame 46 has a first attachment portion 83 disposed near a boundary between the front portion 81 and the arch-shaped central portion 82 for attachment of a central portion of the support frame 51, a second attachment portion 85 disposed on a bottom wall 84 of the arch-shaped central portion 82 for attachment of the upper end 76 of the shock absorber 75, and a third attachment portion 87 disposed near a boundary between the arch-shaped central portion 82 and the rear portion 86 for attachment of a rear end portion of the support frame 51. The second attachment portion 85 is vertically aligned with an apex of the arch-shaped central portion 82.

Each of the left and right rear frames 46, 48 further has a rear frame lower member 91 integrally connected to a bottom wall 88 of the rear portion 86. The rear frame lower member 91 extends along the rear portion 86 of each rear frame 46, 48 and has a front end 92 disposed face to face with and in proximate to a rear end 93 of the support frame 51 and connected to the rear end portion of the support frame 51 via a bracket 94. A rear end of the rear frame lower member 91 and a rear end 89 of each rear frame 46, 48 lie flush with each other and they are integrally connected to an end bracket 95. The end bracket 95 is attached by bolts 101, 102 to the rear bumper beam 26.

The rear bumper beam 26 includes a bumper beam body 96 of hollow structure and left and right bumper beam lower members 98, 98 connected to a bottom wall 97 of the bumper beam body 96 at portions corresponding in position to the rear frame lower members 91, 91. The bolts 101 extend through each end bracket 95 and thread into a corresponding one of the bumper beam lower member 98, while the bolts 102 extend through each end bracket 95 and thread into the bumper beam body 96.

In the support frame 51, the left and right front corner members 56, 57 are connected by welding to opposite ends of the front transverse beam 54, the left and right rear corner members 58, 59 are connected by welding to opposite ends of the rear transverse beam 55, the left longitudinal beam 52 has opposite ends connected by welding to the left front and rear corner members 56, 58, the right longitudinal beam 53 has opposite ends connected by welding to the right front and rear corner members 57, 59, and the central transverse beam 61 has opposite ends connected by welding to the longitudinal central portions of the left and right longitudinal beams 52, 53. The support frame 51 has a left central attachment portion 104 disposed on the central portion of the left longitudinal beam 52 for attachment to the first attachment portion 83 of the left rear frame 46, a right central attachment portion 105 disposed on the central portion of the right longitudinal beam 53 for attachment to the first attachment portion 83 of the right rear frame 48, three rod attachment portions 106 disposed on each of the left and right longitudinal beams 52, 53 for connection to the rods 74 of the suspension unit 23 (FIG. 1), and a displacement control portion 107 provided on each of the left and right rear corner members 58, 59 for a purpose described later.

The left and right floor frames 33, 34 are each comprised of an elongated member of U-shaped cross section, including a bottom wall 111 and a pair of sidewalls 112, 113 extending upwardly from opposite longitudinal edges of the bottom wall 111. The sidewalls 112, 113 each have a side flange 114 at an upper end extending in a lateral outward direction of the floor frame 33, 34. At a rear end portion of each floor frame 33, 34, the bottom wall 111 is bent upward to lie in a higher horizontal plane as at 115, and the upwardly bent bottom wall portion 115 has an end flange 116 extending beyond the level of the side flanges 114 of the sidewalls 112, 113. The left and right floor frames 33, 34 are symmetrical with each other with respect to the longitudinal centerline CL of the vehicle body 12.

The middle floor cross member 35 has a hollow structure formed by two elongated press-formed members 117, 118 of generally Z-shaped cross section disposed one above the other and welded together at upper and lower flanges thereof. The middle floor cross member 35 is connected at opposite ends to the left and right rear frames 46, 48 and has intermediate portions disposed inward of the opposite ends and connected to the rear end portions 115, 115 of the bottom walls 111 of the left and right floor frames 33, 34. The lower member 117 of the middle floor cross member 35 has a pair of nuts 122, 122 welded to an inner surface of the lower flange 117a thereof at positions disposed directly above the bottom wall rear end portions 115, 115 of the floor frames 33, 34, and a pair of collars 123, 123 welded to an outer surface of the lower flange 117a and vertically aligned with the nuts 122, 122, respectively. Each collar 123 is held between the lower flange 117a of the lower member 117 of the middle floor cross member 35 and the bottom wall rear end portion 115 of a respective one of the floor frames 33, 34. The front floor 36 is connected to a front portion of the middle floor cross member 35 formed by welded lower flanges of the two members 117, 118.

Figure 5:
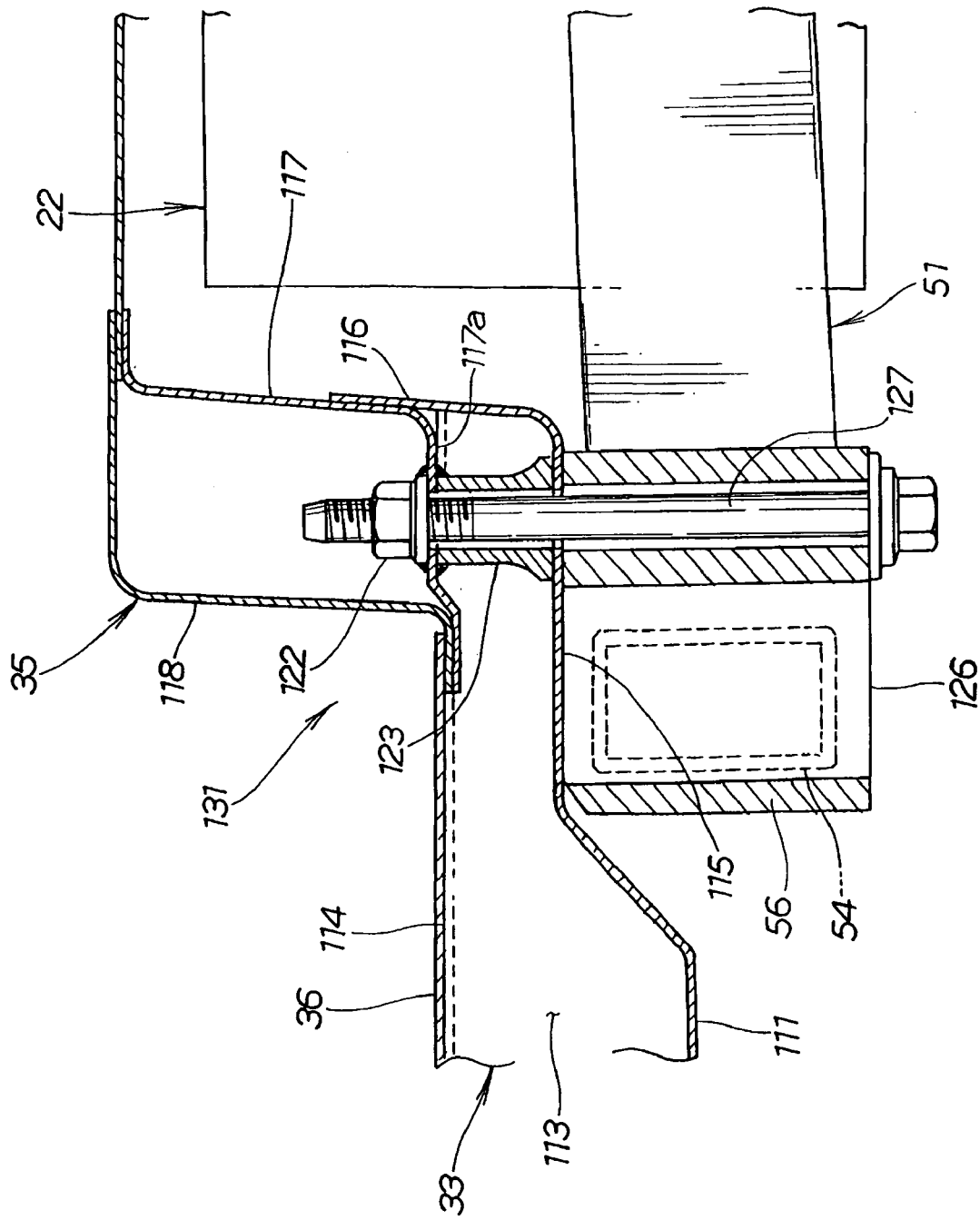
FIG. 5 is a cross-sectional view taken along line V-V of FIG. 3.
Figure 6:
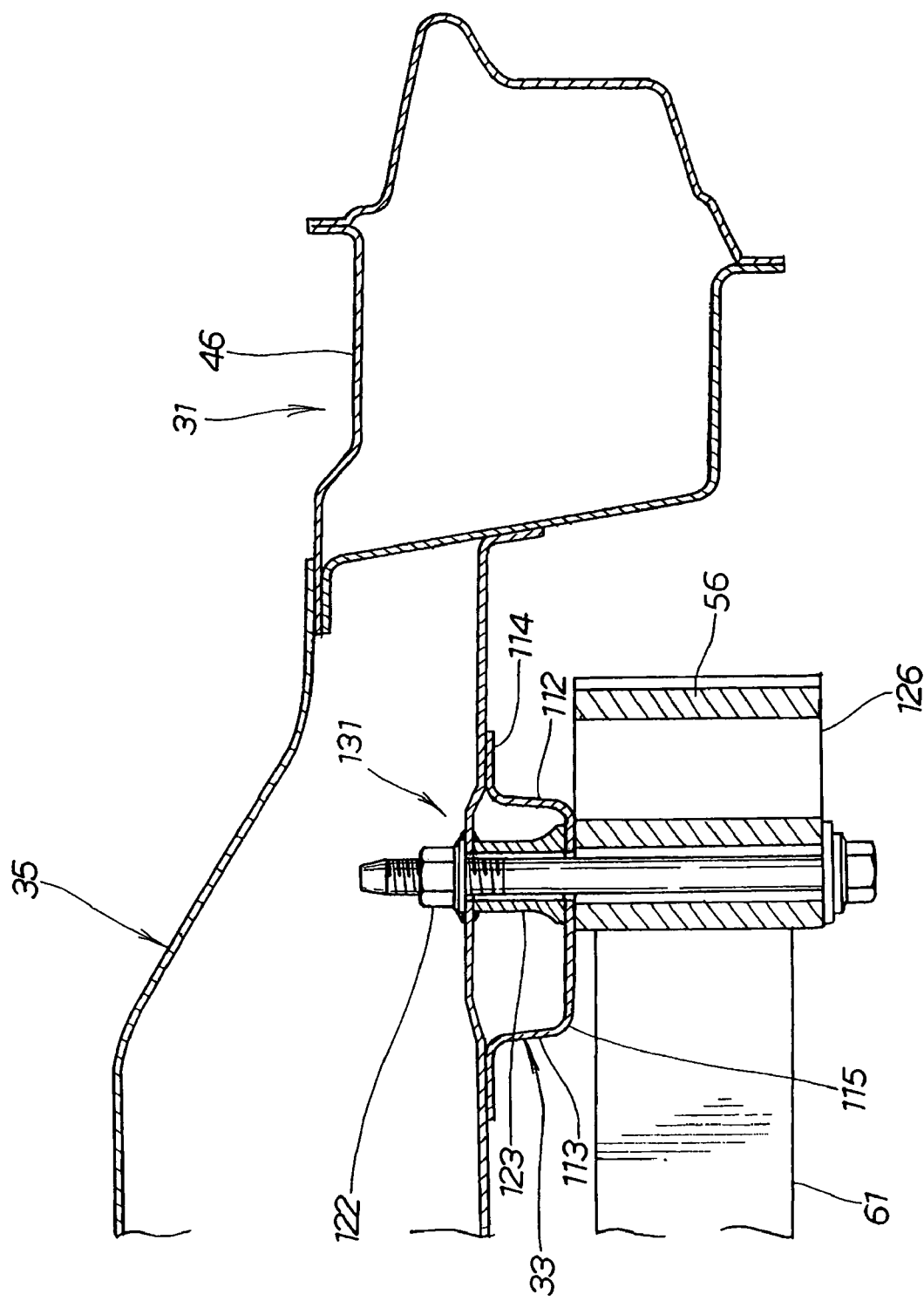
FIG. 6 is a cross-sectional view taken along line VI-VI of FIG. 3.

FIGS. 5 and 6 show a joint structure 131 disposed at a front end 126 of the support frame 51 and formed between the support frame 51, each floor frame (left floor frame 33 being shown), and the middle floor cross member 35. As previously described, the middle floor cross member 35 is formed by the lower and upper members 117, 118 of Z-shaped cross section welded together at their upper and lower flanges. The nut 122 is welded to the inner surface of the lower flange 117a of the lower member 117, and the collar 123 is disposed in vertical alignment with the nut 122 and welded to the outer surface of the lower flange 117a. The middle floor cross member 35 thus constructed is mounted on the rear end portion of the floor frame 33 and welded to the side flanges 114 of the floor frame 33 (see FIG. 6). To attach the front end 126 of the support frame 51 to the rear end portion of the floor frame 33, a bolt 127 extends from below successively through the left front corner member 56 of the support frame 51, the bottom wall rear end portion 115 and the collar 123 and is threaded into the nut 122 so that the support frame front end 125, the floor frame 133 and the middle floor cross member 35 are tightly fastened together. As shown in FIG. 6, the left end of the middle floor cross member 34 is welded to the left rear frame 46 of the left side frame 31. Though not shown in FIG. 6, the right end of the middle floor cross member 34 is welded to the right rear frame 48. The left end of the middle floor cross member 35 is welded to a respective one of the rear frames 46, 48 of the side frames 31, 32.

It will be appreciated from the foregoing that the middle floor cross member 35 extends transversely between and interconnects the front ends of the left and right rear frames 46, 48, the left and right floor frames 33, 34 have rear end portions connected to the middle floor cross member 35, and the front end 126 of the support frame 51 is connected to the floor frames 33, 34 at junctions between the floor frames 33, 34 and the middle floor cross member 35 where the joint structure 131 is disposed.

Referring back to FIG. 4, two bolts 132, 132 extend from below through the central attachment portions 104, 105 of the left and right longitudinal beams 52, 53 and are threaded into the first attachment portions 83, 83 of the left and right rear frames 46, 48 so that the central portion of the support frame 51 is attached to the rear frames 46, 48. The hydrogen tank 21 and the capacitor 22 (both shown in FIG. 1) are supported on the support frame 51 with the tank 21 disposed between the central transverse beam 61 and the rear transverse beam 55 and with the capacitor 22 disposed between the front transverse beam 54 and the central transverse beam 61.

As shown in FIG. 4, the rear end 93 of the support frame 51 is attached to the rear frames 46, 48 by means of two bolts 141, which extend from below through the left and right rear corner members 58, 59 and are threaded in the third attachment portions 87, 87 of the left and right rear frames 46, 48.

Figure 8:
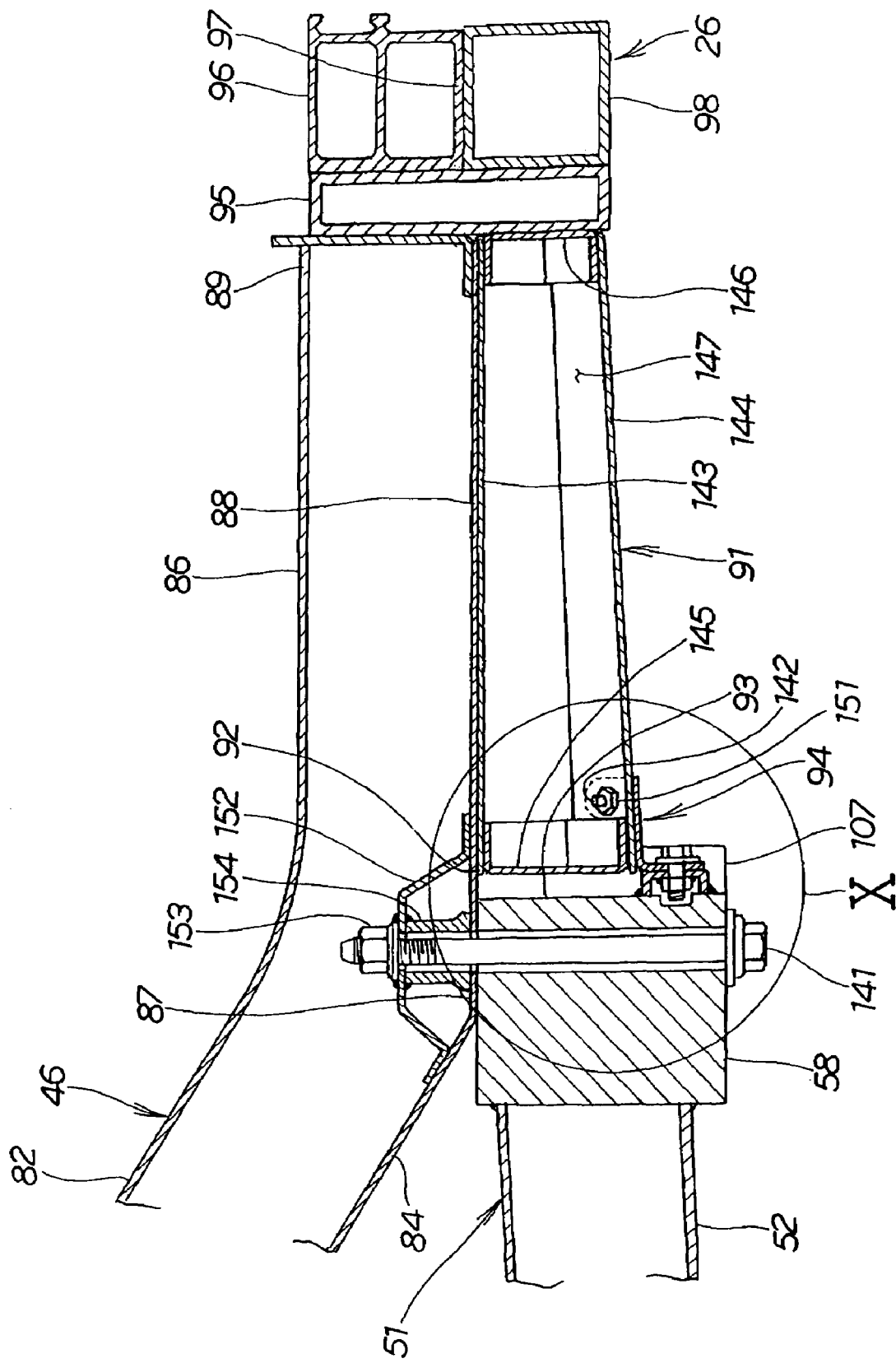
FIG. 8 is a cross-sectional view taken along line VIII-VIII of FIG. 3.
Figure 9:
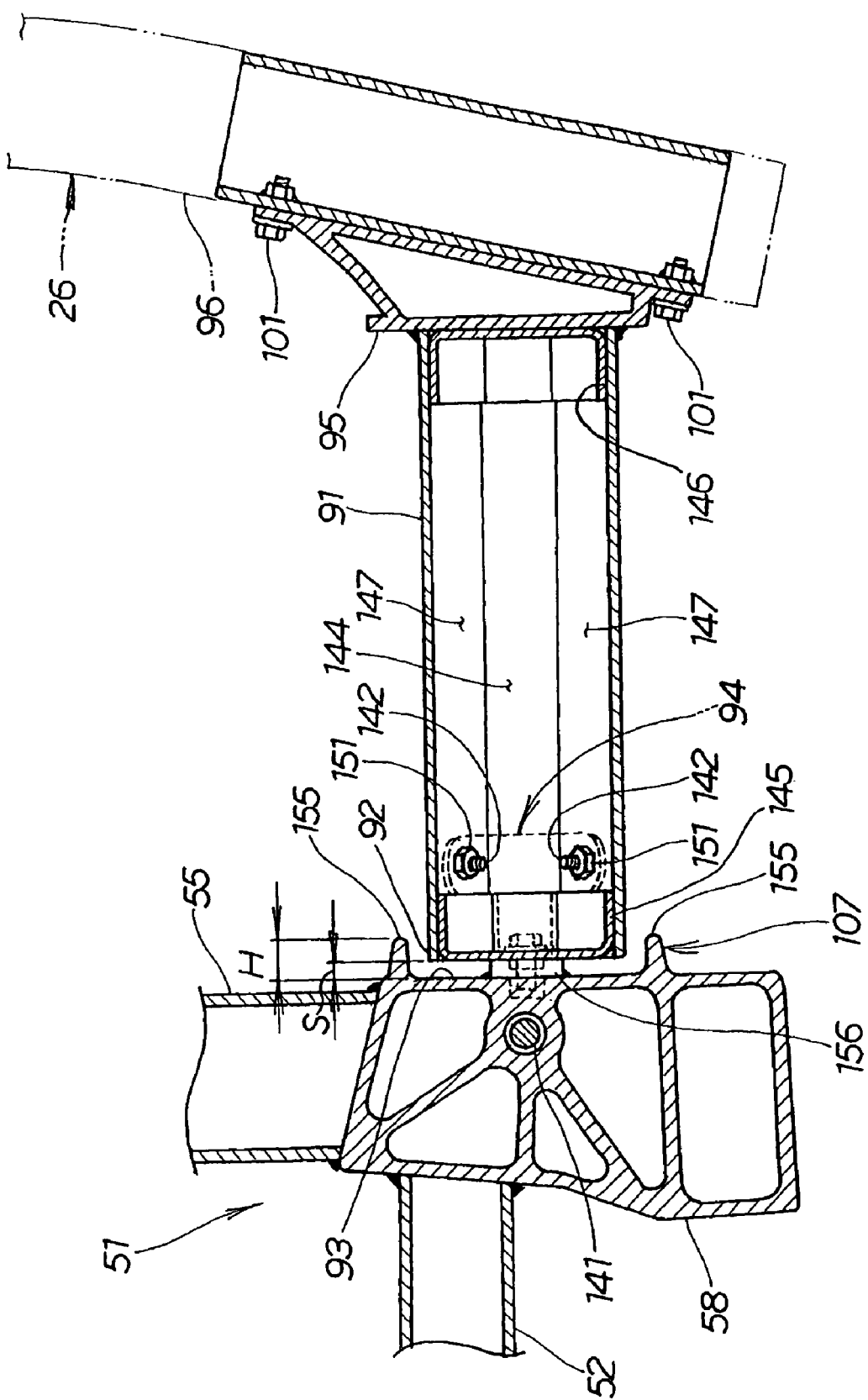
FIG. 9 is a cross-sectional view taken along line IX-IX of FIG. 1.
Figure 10:
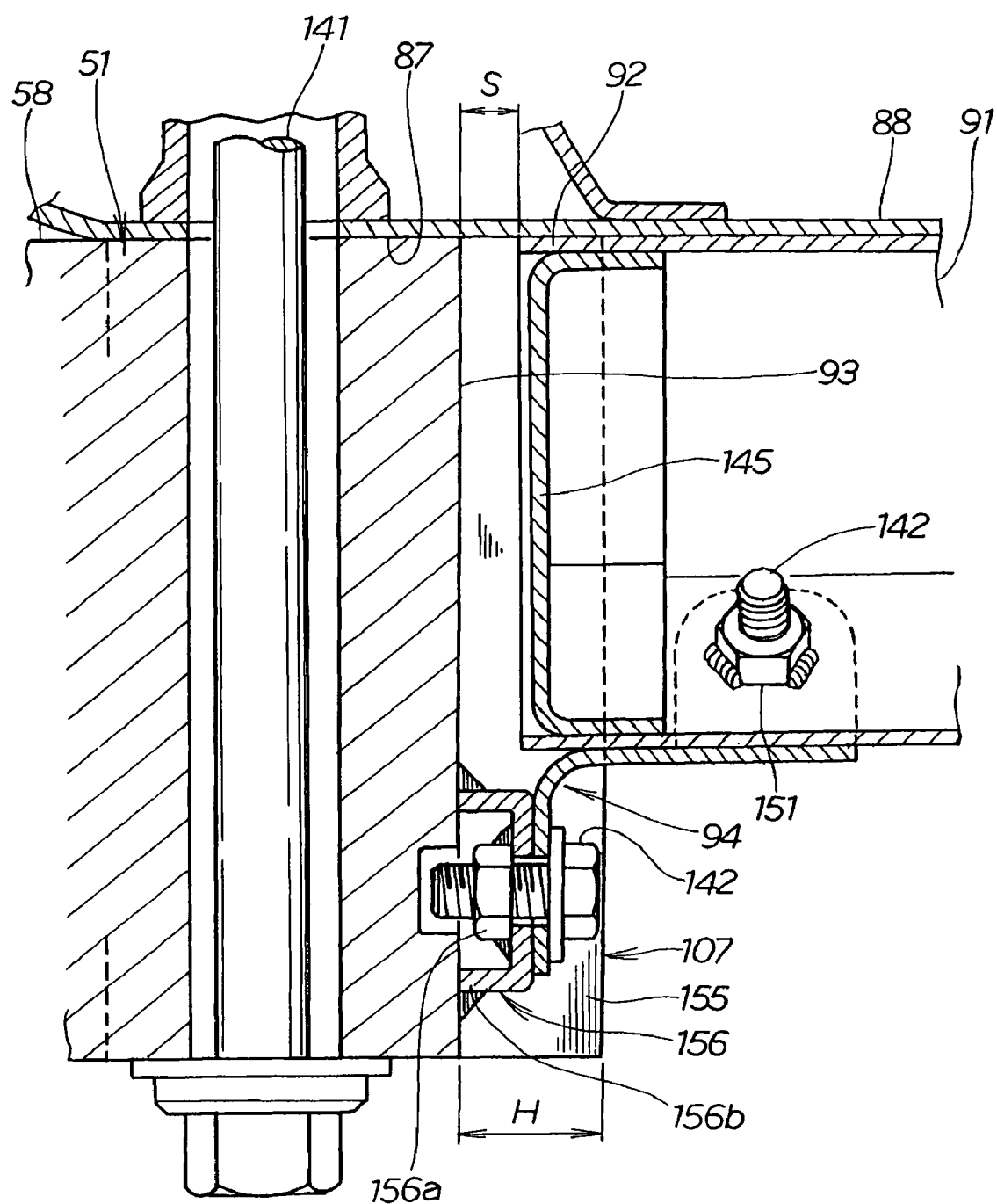
FIG. 10 is an enlarged view of a part of FIG. 8 that is indicated by a circle X in FIG. 8.

Referring next to FIGS. 8 to 10, the left rear corner member 58 of the support frame 51 is connected to the second attachment portion 87 of the left rear frame 86 by means of the bolt 141. The left rear corner member 58 is connected via the bracket 94 to the front end 92 of the rear frame lower member 91 of the left rear frame 46 with a space S (FIGS. 9 and 10) defined between the corner member 58 and the rear frame lower member 91. The bracket 94 is connected by bolts 142 to both the rear frame lower member 91 and the left rear corner member 58. Though not shown in FIGS. 8-10 but as understood from FIG. 4, the right rear corner member 59 is connected by bolts 142 to the front end 92 of the rear frame lower member 91 of the right rear frame 48 via the bracket 94, with a space S defined between the corner member 59 and the rear frame lower member 91 of the right rear frame 48.

As shown in FIGS. 8 and 9, each of the rear frame lower members (the rear frame lower member 91 being shown) comprises a hollow polygonal tube having a top wall 143 (FIG. 8) welded to the bottom wall 88 of each of the rear frames 86, a bottom wall 144 opposite the top wall 143, and a pair of sloped lower sidewalls 147, 147 extending obliquely outward in an upward direction from opposite longitudinal edges of the bottom wall 144. The hollow tubular rear frame lower member 91 further includes a front core member 145 and a rear core member 146 firmly fitted in the front end 92 and the rear end (not designated), respectively, of the rear frame lower member 91 to close the hollow tubular rear frame lower member 91 at opposite ends thereof. The rear frame lower member 91 also has a pair of nuts 151, 151 welded to the sloped sidewalls 147, 147 at portions located near the front end 92 of the rear frame lower member 91 for threaded engagement with the bolts 142 to attach the bracket 94 to the rear frame lower member 91. The shape of the rear frame lower members 91 should by no means be limited to the hollow polygonal tube as in the illustrated embodiment, but may include a channel-like configuration devoid of a top wall.

The third attachment portion 87 of each rear frame (left rear frame 86 being shown in FIG. 8) includes a frustoconical seat member 152 attached by welding to the bottom wall 88 of the rear portion 86 and the bottom wall 84 of the arch-shaped central portion 82 of the rear frame 46, a nut 153 connected by welding to an upper surface of a top wall of the frustoconical seat member 152, and a collar 154 connected by welding to a lower surface of the top wall of the frustoconical seat member 152. The bolt 141 extends successively through the corner member 58, the bottom wall 88 of the rear portion 86, the collar 154 and the top wall of the frustoconical seat member 152 and is threaded in the nut 153 so that the rear end 93 of the support frame 51 and the third attachment portion 87 of the rear frame 46 are tightly fastened together.

As shown in FIG. 9, the displacement control portion 107 provided on each rear corner member (left rear corner member 58 being shown) includes a pair of parallel spaced vertical ribs 155, 155 projecting from the rear end 93 of the support frame 51. The ribs 155 have a length equal to a height of the rear corner member 58 and a height H larger than the space S between the rear end 93 of the support frame 51 and the front end 92 of the rear frame lower member 91. The ribs 155 are spaced in a widthwise direction of the vehicle body by a distance larger than a width of the front end portion of the rear frame lower member 91 so that distal end portions of the ribs 155 are disposed on and extending along opposite outer sides of the front end portion of the rear frame lower member 91. With the ribs 155, 155 thus arranged, the displacement control portion 107 is able to prevent the front end 92 of the rear frame lower member 91 from displacing in the widthwise direction of the vehicle body beyond a range defined between the ribs 155.

Each of the left and right rear corner members (left one 58 being shown in FIG. 10) has an internally threaded portion 156 into which the bolt 142 is threaded to attach the bracket 94 to the rear corner member 58. The internally threaded portion 156 includes a nut 156a attached by welding to an inside surface of a U-shaped attachment seat 156b welded to the rear corner member 58 at an open end thereof. The internally threaded portion 156 having the nut 156a is disposed on a lower end portion of the rear corner member 58 and located centrally between the ribs 155.

Figure 11:
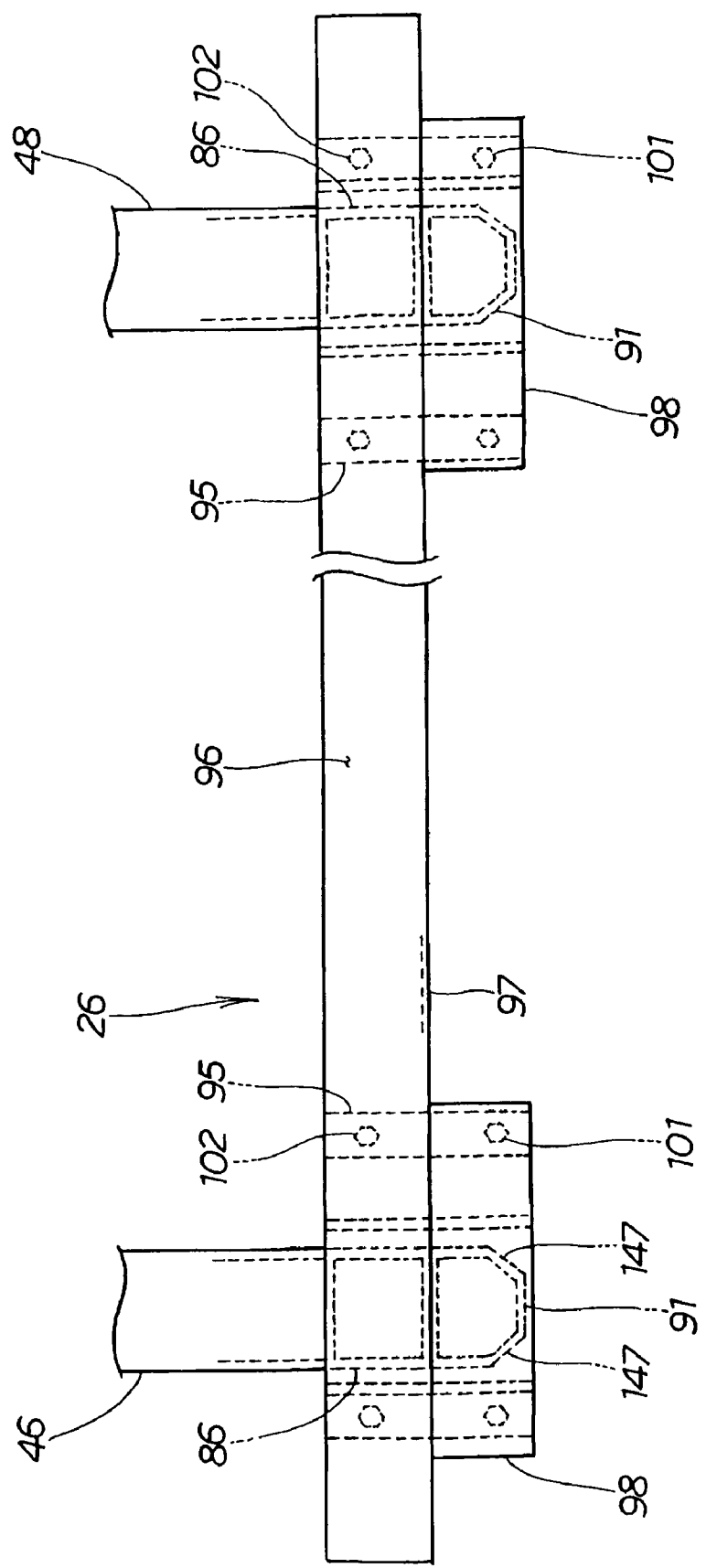
FIG. 11 is a view in a direction of the arrow XI of FIG. 3.

As shown in FIG. 11, each of the left and right bumper beam lower members 98 is attached to the bottom wall 97 of the bumper beam body 96 and located at a position corresponding to the position of a respective one of the rear frame lower members 91 so that force acting on the rear bumper beam 26 from behind is directly transmitted from the bumper beam lower member 98 to the corresponding rear frame lower member 91. The bumper beam body 96 is attached via the end brackets 95 to the rear ends 89 (FIG. 8) of the rear portions 86 of the rear frames 46, 48 (FIG. 4) so that force applied to the rear bumper beam 26 from behind is also transmitted from the bumper beam body 96 to the rear portions 86 of the rear frames 46, 48.

Figure 12:
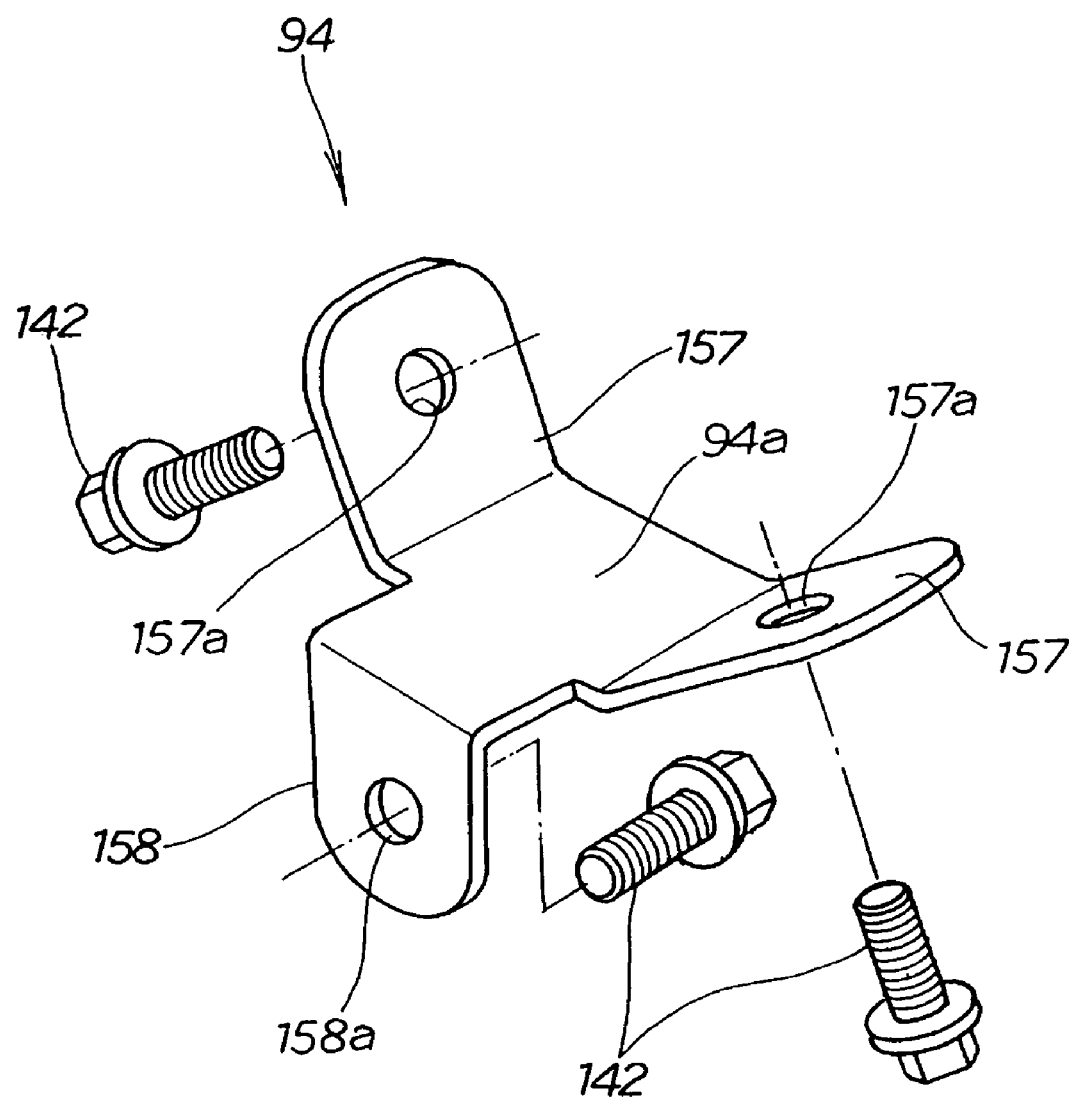
FIG. 12 is a perspective view of a bracket used for connection between the support frame and a rear frame of the vehicle rear body structure.

FIG. 12 shows in perspective the bracket 94 used for attaching the front end 92 of each rear frame lower member 91 to a respective one of the rear corner members 58, 59 forming the rear end 93 of the support frame 51 in such a manner that the front end 92 of the rear frame lower member 91 is disposed close to the rear end 93 of the support frame 51 with a space S defined therebetween, as shown in FIGS. 8-10. As shown in FIG. 12, the bracket 94 has a rectangular body 94a, a pair of first attachment lugs 157, 157 projecting obliquely upward from opposite longitudinal edges of the bracket body 94a, and a second attachment lug 158 extending vertically downward from an end of the bracket body 94a. The first attachment lugs 157 have an angle of inclination equal to that of the inclined lower sidewalls 147 (FIGS. 8 and 9) of each rear frame lower member 91. With this arrangement, when the bracket 94 is placed in an attachment position, the first attachment lugs 157 lie flat on outer surfaces of the inclined lower sidewalls 147, 147 of the rear frame lower member 91, and the second attachment lug 158 lies flat on an outer surface of the U-shaped attachment seat 156b of the internally threaded portion 156 (FIG. 10) of a respective one of the rear corner members 58, 59. Each of the first attachment lugs 157 has a hole 157a through which one of the bolts 142 extends when the bolt 14 is threaded into a respective one of the nuts 151 (FIGS. 8 and 9) welded to inner surfaces of the inclined lower sidewalls 147 of each rear frame lower member 91. Similarly, the second attachment lug 158 has a hole 158a through another bolt 142 extends when the bolt 142 is threaded into the nut 156a (FIG. 10) forming the internally threaded portion 156 of a respective one of the rear corner members 58, 59 at the rear end 93 of the support frame 51.

Figure 13:
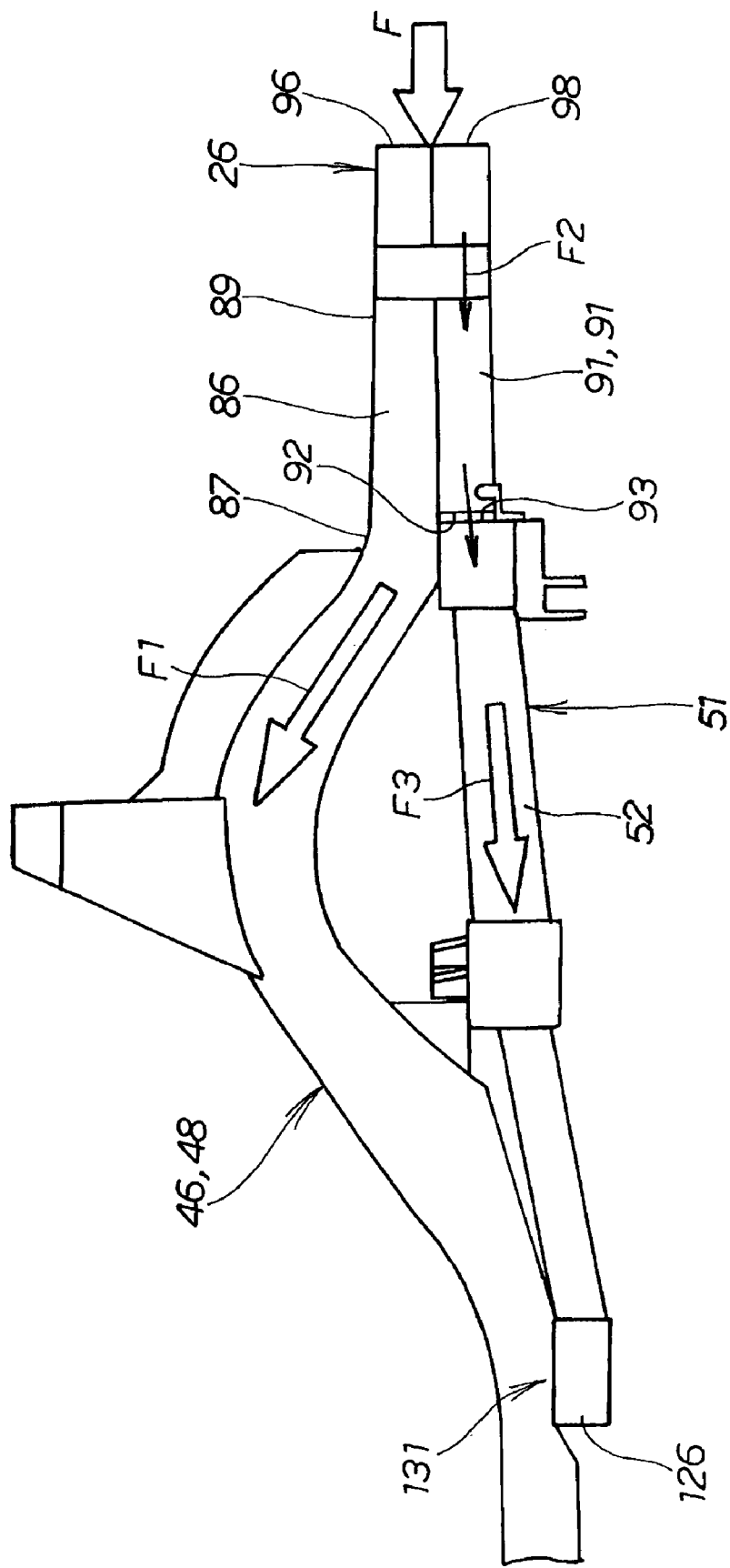
FIG. 13 is a diagrammatical side view illustrative of the manner in which force acting on a rear end of the vehicle rear body structure is transmitted in a forward direction through the rear frame and the support frame.

Operation of the vehicle rear body structure performed when an impact force is applied to the rear bumper beam 26 from behind will be described with reference to FIG. 13. As shown in this figure, an impact force F applied to the rear bumper beam 26 from behind is transmitted from the bumper beam body 96 to the rear frames 46, 48 as indicated by the profiled arrow F1. At the same time, the impact force F is also transmitted from each of the bumper beam lower members 98 to a respective one of the rear frame lower members 91, 91, as indicated by the arrow F2, and subsequently to the support frame 51, as indicated by the profiled arrow F3. By thus distributing the impact force F to the rear frames 46, 48 and the support frame 51, it is possible to reduce the force or load exerted on the rear frames 46, 48. This leads to an improvement in the overall rigidity of the vehicle ear body structure.

As the force F2 is transmitted from the rear frame lower members 91 to the support frame 51, it may occur that the front ends 92 of the rear frame lower members 91 are brought into abutment with the rear end 93 of the support frame 51. This end-to-end abutment ensures that the force F2 can be transmitted from the rear frame lower members 91 to the support frame 51 without branching to the rear frames 46, 48.

Furthermore, since the front end 92 of each rear frame lower member 91 is connected via the bracket 94 to the rear end 93 of the support frame 51 with the space S defined therebetween, as shown in FIGS. 9 and 10, it is possible to take up accumulated tolerances of the rear frame lower member 91 and the support frame 51 in the longitudinal direction of the vehicle body. This arrangement facilitates easy assembly of the support frame 51 to the rear frames 46, 48. Additionally, by virtue of the displacement control portion 107 (FIG. 9) including the ribs 155, it is possible to prevent the front end 92 of each rear frame lower member 91 from displacing in a widthwise direction of the vehicle beyond a certain range defined between the ribs 155.

Figure 7:
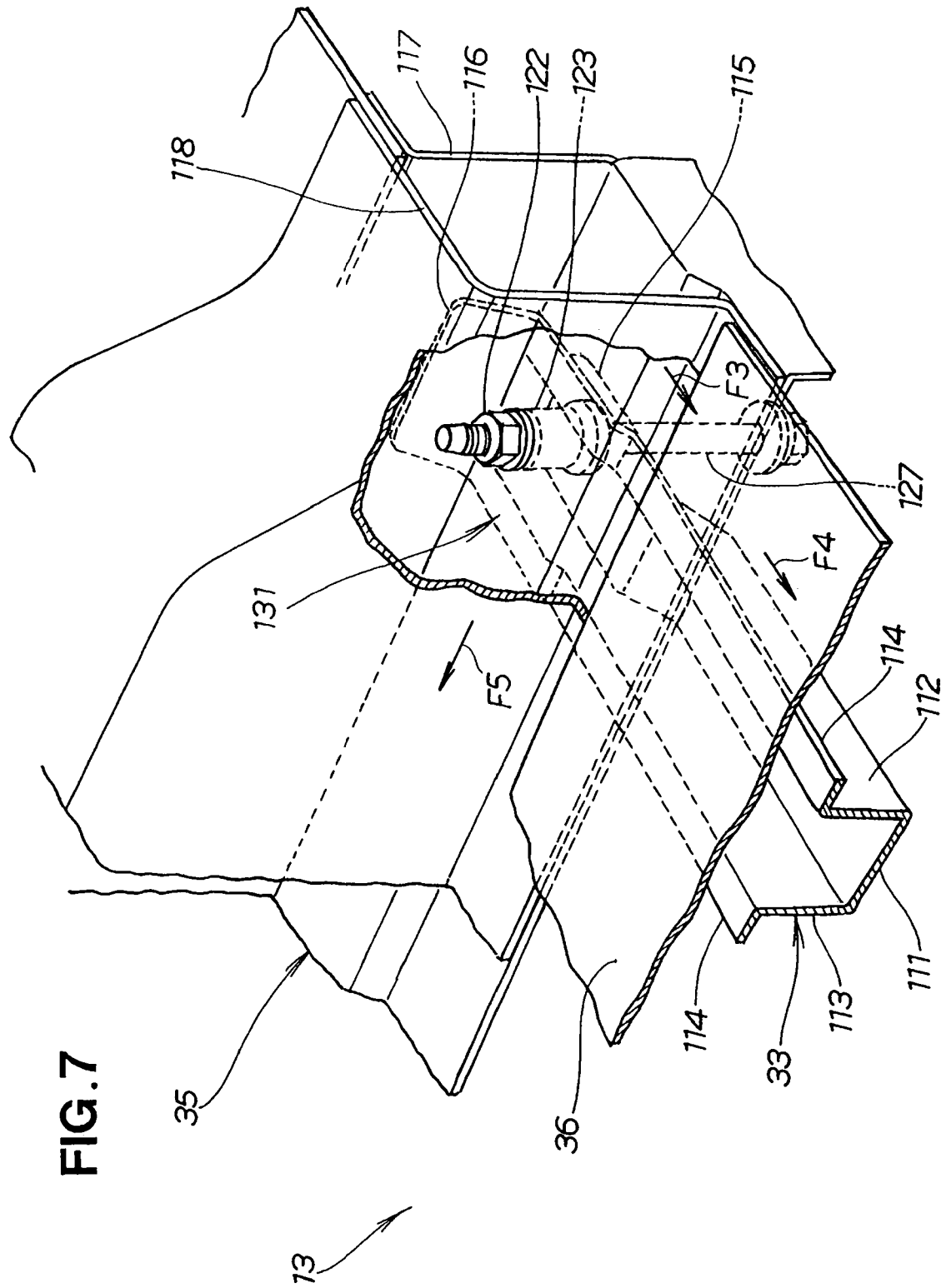
FIG. 7 is a perspective view, with part cutaway for clarity, showing the manner of distribution a force occurring at a joint portion between a support frame, a floor frame and a cross member of the vehicle rear body structure.

The force F3 is subsequently transmitted from the support frame 51 to the joint structures 131, which are disposed at a front end 126 of the support frame 51 and each formed between the support frame 51 (FIG. 7), a respective one of the floor frames 33, 34, and the middle floor cross member 35. In this instance, as shown in FIG. 7, the force F3 transmitted from the support frame 51 to each joint structure 131 is distributed to the corresponding floor frame 33 as indicated by the arrow F4 and also to the floor middle cross member 35 as indicated by the arrow F5. By thus distributing the force F4, it is possible to reduce the force or load exerted on the respective parts of the under body 13 that forms a main part of the rear body structure according to the invention. Thus arrangement achieves a further improvement in the rigidity of the vehicle body 12 (FIG. 1).

In the joint structure 131, the collar 123 is held between the bottom wall rear end portion 115 (FIG. 5) of the floor frame 33 and the lower flange 117a of the Z-shaped lower member 117 of the floor middle cross member 35, and the bolt 127 extends successively through the front end 126 of the support frame 51, the bottom wall rear end portion 115, the collar 123, and the lower flange 117a of the lower member 117, and is threaded into the nut 122 welded to the inner surface of the lower flange 17. With this arrangement, the collar 123 serves to provide an axial tension to the bolt 127, so that the front end 93 of the support frame 51, the rear end portion of the floor frame 33 and the floor middle cross member 35 are tightly fastened together by a threaded fastener composed of the bolt 127 and the nut 122. By thus forming the joint structures 131, it is possible to increase the rigidity of the vehicle body 12.

Figure 14:
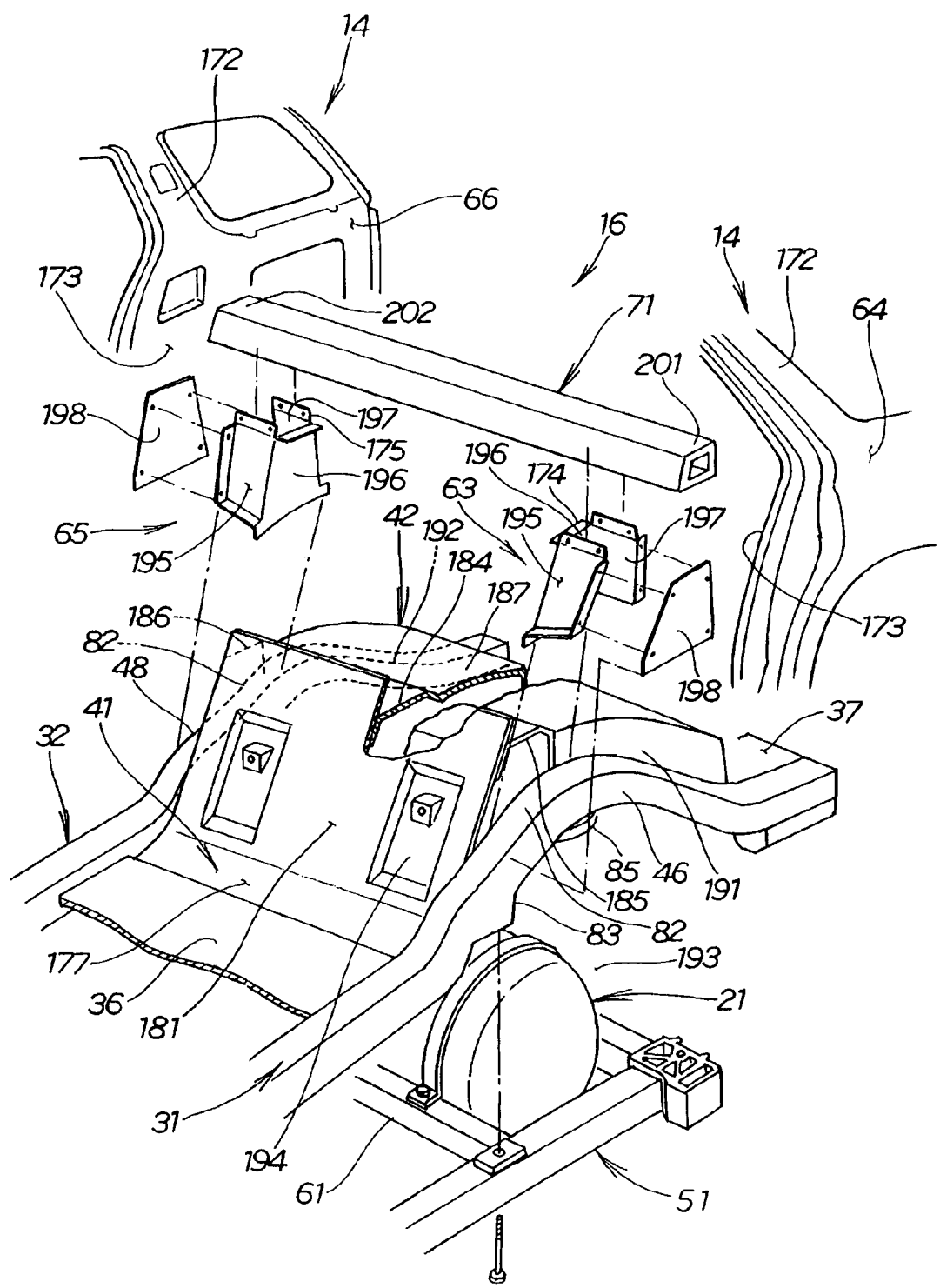
FIG. 14 is an exploded perspective view, with parts cutaway for clarity, of a rear part of the vehicle rear body structure, which is reinforced to support a suspension unit.
Figure 16A:
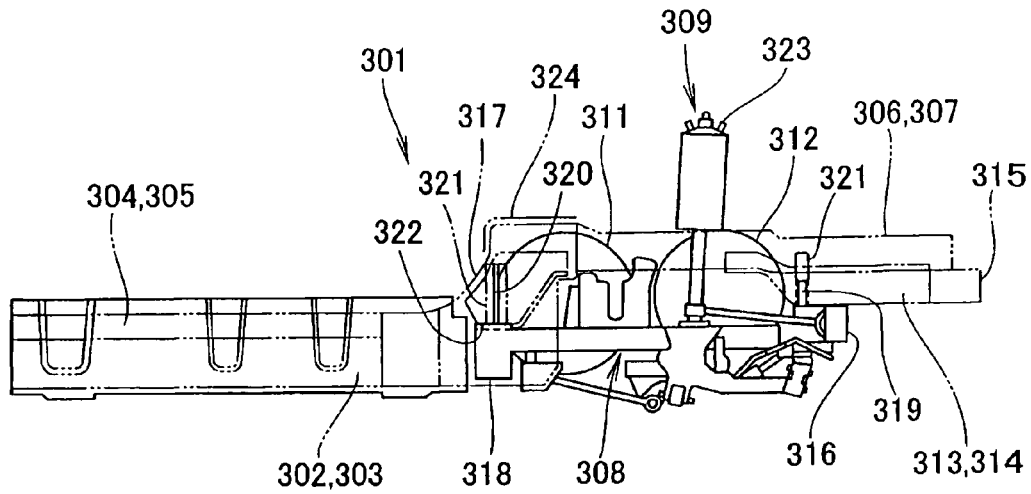
FIG. 16A is a side view showing a conventional vehicle rear body structure.
Figure 16B:
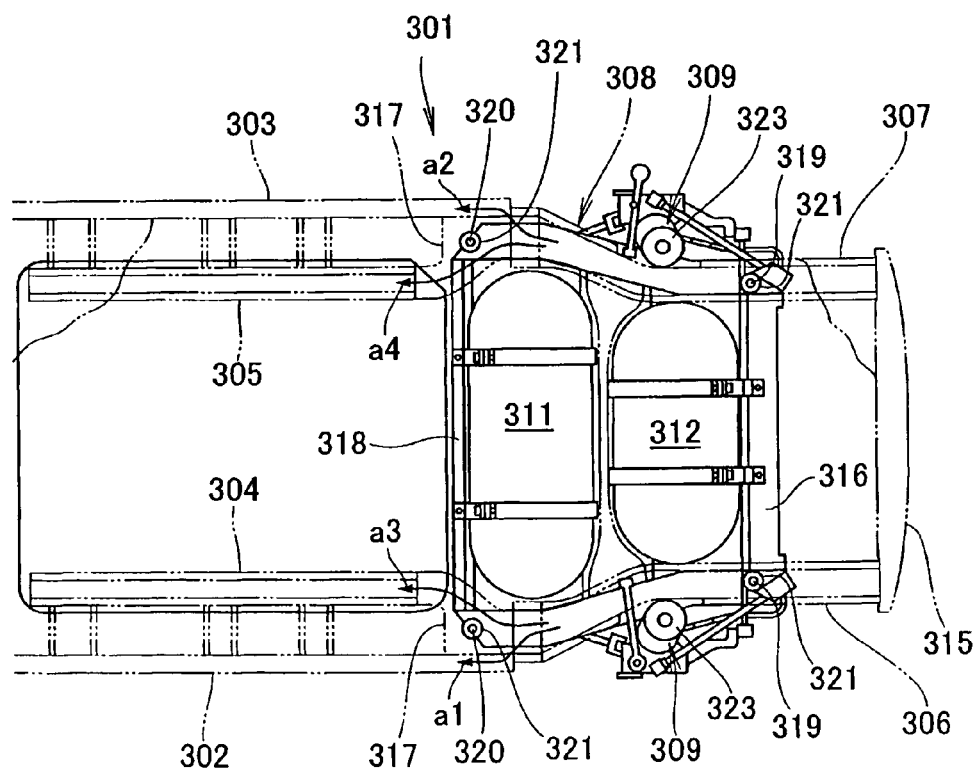
FIG. 16B is a plan view of FIG. 16A.

As shown in FIG. 14, the left rear fender 64 of the left side body 14 includes a rear pillar 172 and a parcel frame attachment portion 173 disposed below the rear pillar 172 for attachment of the parcel frame (cross member) 71 to the left rear fender 64. Similarly, the right rear fender 66 of the right side body 14 includes a rear pillar 172 and a parcel frame attachment portion 173 disposed below the rear pillar 172 for attachment of the parcel frame 71 to the right rear fender 66.

As previously described, the rear body 16 includes the parcel frame (cross member) 71 extending transversely between the left and right rear fenders 64, 66 and attached at opposite ends to the respective parcel frame attachment portions 173 of the left and right rear fenders 64, 66. The parcel frame 71 is also attached to upper ends 174, 175 of the left and right box members 63, 65.

The partition wall 42 extends between the seat frame 41 of the rear seat 24 (FIG. 1) and the rear floor 37 for separating the passenger compartment (FIG. 2) and a tank chamber 193 in which the fuel tank (hydrogen tank) 21 is disposed. The partition wall 42 includes a front wall 181, a top wall 184 extending from a vertical central portion of the front wall 181 in a rearward direction, and a rear wall 187 contiguous with and extending rearward from a rear end of the top wall 184. The front wall 181 is connected at a lower end thereof to a seat cushion frame 177 of the seat frame 41 and, at an upper end thereof, to the parcel frame 71. The front wall 181 has opposite side edges connected to the left and right rear frames 46, 48. The top wall 184 has opposite side edges 185, 186 connected to the box members 63, 65. The rear wall 187 has left and right sidewall portions 191, 192 connected to the left and right rear frames 46, 48, and a rear end connected to the rear floor 37. The front wall 181 has a portion 194 serving also as a seatback frame 194 used for the rear seat 24 (FIG. 1).

The box member 63 is disposed directly above the second attachment portion 85 provided on the bottom wall 84 (FIG. 4) of the arch-shaped central portion 82 of the left rear frame 46 for attachment of the upper end 76 of the shock absorber 75. The box member 63 has a front wall 195 connected to the left side edge of the front wall 181 and the arch-shaped central portion 82 of the left rear frame 46, an inner sidewall 196 contiguous with and extending rearward from an inner vertical edge of the front wall 195 and connected to the arch-shaped central portion 82 of the left rear frame 46, a rear wall 197 contiguous with and extending from a rear vertical edge of the inner sidewall 196 in a lateral outward direction and attached to the arch-shaped central portion 82 of the left rear frame 46, and an outer sidewall 198 formed separately from the front wall 195, inner sidewall 196 and rear wall 197. The outer sidewall 198 is connected to outer vertical edges of the front end rear walls 195, 197 and also to the arch-shaped central portion 82 of the left rear frame 46. The inner sidewall 196 is connected to the left side edge 185 of the top wall 184 so that it serves also as a left sidewall portion of the top wall 184. Thus, the inner sidewall 196 forms a part of the partition wall 42.

The box member 65 is disposed directly above the second attachment portion 85 provided on the bottom wall 84 (FIG. 4) of the arch-shaped central portion 82 of the right rear frame 48 for attachment of the upper end 76 of the shock absorber 75. The box member 65 is identical in structure to the box member 63 and disposed in mirror image relative to the box member 63. Thus, an inner sidewall 196 of the box member 65 serves also as a right sidewall portion of the top wall 184 and hence forms a part of the partition wall 42.

The parcel frame (cross member) 71 comprises a rectangular hollow tube and has a left end 201 connected to the parcel frame attachment portion 173 of the left rear fender 64, and a right end 202 connected to the parcel frame attachment portion 173 of the right rear fender 66. The parcel frame 71 is also connected to the upper ends 174, 175 of the box members 63, 65 at portions located near the left and right ends 201, 202 thereof The parcel frame (cross member) 71 may be replaced with a channel-shaped frame disposed with an open side facing upward.

By virtue of the partition wall 42 of the foregoing construction, the passenger compartment 27 (FIG. 2) and the tank chamber 193 (FIG. 14) are separated or isolated from one another. Thus, even when a fuel gas contained in the fuel tank (hydrogen tank) 51 leaks into the tank chamber 193, inflow of the fuel gas from the tank chamber 193 into the passenger chamber 27 does not take place. Furthermore, since the sidewall portions of the top wall 184 are formed by the inner sidewalls of the box members 63, 65, the partition wall 42 is relatively light in weight. Additionally, since the front wall 181 of the partition wall 42 forms a part of the seatback frame 194 (FIG. 14) of the rear seat 24 (FIG. 1), it is possible to reduce the number of parts and the weight of the rear seat 24.

It will be appreciated that the parcel frame (cross member) 71 extending crosswise between the left and fright rear fenders 64, 66 is connected to the arch-shaped central portions 82 of the left and right rear frames 46, 48 via the box members 63, 65 disposed directly above the second attachment portions 85 provided for attachment to the upper ends 76 of the shock absorbers 75 of the left and right suspension units 23. With this arrangement, the parcel frame 71 and the box members 63, 65 jointly form a reinforcement 205 (FIG. 15), which reinforces the arch-shaped central portions 82 of the rear frames 46, 48 against undue elastic deformation when subjected to a severe upward thrust applied through the suspension devices 23 during traveling of the vehicle.

Operation of the reinforcement 205 will be described below with reference to FIG. 15. When an upward force or thrust Ft is applied from each rear wheel 23 (left rear wheel being shown) to the corresponding shock absorber 75, the upward thrust Ft is transmitted via the attachment portion 85 to the arch-shaped central portion 82 of the left rear frame 46, as indicated by the arrows b1. The upward thrust Ft is then transmitted to the box member 63, as indicated by the arrows b2, and subsequently to the parcel frame (cross member) 71, as indicated by the arrows b3, from which the upward thrust Ft is transmitted to the left rear fender 64 (FIG. 14). During such transmission, the upward thrust Ft is considerably reduced. By thus providing the reinforcement 205, it is possible to increase the rigidity of the rear frames 46, 48, leading to an increase in the total rigidity of the vehicle body 12.

As shown in FIGS. 2, 4 and 15, the attachment portions 85 for the shock absorbers 75 are provided on the bottom walls 84 of the arch-shaped central portions 82 of the left and right rear frames 46, 48. This arrangement obviates the need for provision of cantilevered attachment members projecting from the left and right rear frames 46, 48 toward the left and right rear fenders 64, 66. The attachment portions 85 are rigid enough to withstand direct transmission of loads from the shock absorbers 75.

Although in the illustrated embodiment the invention is employed in a rear frame structure of a four-wheeled vehicle, it is possible to employ the invention in a three-wheeled vehicle. Furthermore, the vehicle shown in the illustrated embodiment is hydrogen fuel cell vehicle. The invention should by no means be limited to the illustrated hydrogen fuel cell vehicle but may be employed in a gasoline-fueled vehicle.

Obviously, various minor changes and modifications of the present invention are possible in the light of the above teaching. It is therefore to be understood that within the scope of the appended claims the invention may be practiced otherwise than as specifically described.

What is claimed is:

1. A vehicle rear body structure comprising:
    left and right side frames laterally spaced from each other and extending in a longitudinal direction of a vehicle body, each of the side frames including a rear frame extending along a rear part of the vehicle body and a side sill contiguous with and extending forwardly from a front end of the rear frame;
    left and right floor frames disposed between the left and right side frames and each extending alongside a respective one of the side sills of the side frames; and
    a support frame of generally rectangular shape attached to the side frames from below for supporting thereon a vehicle part, the support frame having a front end connected to the floor frames and a rear end connected to the rear frames.

2. The vehicle rear body structure according to claim 1, further comprising a cross member extending transversely between and interconnecting the front ends of the rear frames, wherein the floor frames have rear end portions connected to the cross member, the front end of the support frame is connected to the floor frames at junctions between the floor frames and the cross member.

3. The vehicle rear body structure according to claim 2, further comprising a collar disposed between each of the rear end portions of the floor frames and the cross member, and a bolt extending successively through the front end of the support frame and the collar and being threaded in the cross member so that the front end of the support frame, the rear end portion of each floor frame and the cross member are tightly fastened together.

4. The vehicle rear body structure according to claim 1, wherein the generally rectangular support frame includes a central attachment portion disposed intermediately between the front end and the rear end of the support frame and connected to each of the rear frames, and wherein the vehicle part supported on the support frame comprises a fuel tank disposed between the central attachment portion and the rear end of the support frame.

5. The vehicle rear body structure according to claim 1, further comprising a rear frame lower member connected to an under side of a rear portion of each of the rear frames and extending longitudinally along the rear portion of each rear frame, the rear frame lower member having a front end disposed face-to-face with and in proximity to the rear end of the support frame.

6. The vehicle rear body structure according to claim 5, further comprising a rear bumper beam attached to rear ends of the rear frames and extending in a widthwise direction of the vehicle body, said rear bumper beam comprising a bumper beam lower member attached to an under side of a bumper beam body at a portion corresponding in position to the rear frame lower member.

7. The vehicle rear body structure according to claim 5, further comprising a bracket attached to the front end of the rear frame lower member and the rear end of the support frame to thereby connect together the rear frame lower member and the support frame.

8. The vehicle rear body structure according to claim 5, wherein the support frame has a displacement control portion disposed on the rear end thereof for preventing the front end of the rear frame lower member from displacing in a widthwise direction of the vehicle body beyond a predetermined range.

9. The vehicle rear body structure according to claim 8, wherein the displacement control portion comprises a pair of ribs spaced in the widthwise direction of the vehicle body and projecting from the rear end of the support frame such that distal end portions of the ribs are disposed on opposite outer sides of the front end of the rear frame lower member.

10. The vehicle rear body structure according to claim 1, further comprising a suspension unit including a shock absorber having an upper end connected to a respective one of the rear frames, a cross member disposed above the suspension unit and interconnecting left and right rear fenders of the vehicle body, and a box member disposed between each of the rear frames and the cross member, the cross member being connected to each of the rear frames via the box member.

11. The vehicle rear body structure according to claim 10, wherein each of the rear frames has an arch-shaped portion bent upward and having an attachment portion disposed on an underside of the arch-shaped portion in vertical alignment with an apex of the arch-shaped portion for attachment of the upper end of the shock absorber.

12. The vehicle rear body structure according to claim 10, further comprising a partition wall configured to separate a passenger compartment and a tank chamber in which a fuel tank is disposed, the fuel tank forming the vehicle part supported on the support frame, the box member having a portion forming at least part of the partition wall.

13. The vehicle rear body structure according to claim 12, wherein the partition wall is connected to the cross member and the rear frames.

14. The vehicle rear body structure according to claim 12, further comprising a rear seat having a seatback frame, wherein the partition wall forms a part of the seatback frame.

15. A vehicle rear body structure comprising
left and right side frames laterally spaced from each other and extending in a longitudinal direction of a vehicle body, each of the side frames including a rear frame extending along a rear part of the vehicle body;
a support frame of generally rectangular shape attached to the rear frames from below for supporting thereon a vehicle part; and
a rear frame lower member connected to an under side of a rear portion of each of the rear frames and extending longitudinally along the rear portion of each rear frame, the rear frame lower member having a front end disposed face-to-face with and in proximity to a rear end of the support frame.

16. The vehicle rear body structure according to claim 15, further comprising a rear bumper beam attached to rear ends of the rear frames and extending in a widthwise direction of the vehicle body, said rear bumper beam comprising a bumper beam lower member attached to an under side of a bumper beam body at a portion corresponding in position to the rear frame lower member.

17. The vehicle rear body structure according to claim 15, further comprising a bracket attached to the front end of the rear frame lower member and the rear end of the support frame to thereby connect together the rear frame lower member and the support frame.

18. The vehicle rear body structure according to claim 15, wherein the support frame has a displacement control portion disposed on the rear end thereof for preventing the front end of the rear frame lower member from displacing in a widthwise direction of the vehicle body beyond a predetermined range.

19. The vehicle rear body structure according to claim 18, wherein the displacement control portion comprises a pair of ribs spaced in the widthwise direction of the vehicle body and projecting from the rear end of the support frame such that distal end portions of the ribs are disposed on opposite outer sides of the front end of the rear frame lower member.

20. A vehicle rear body structure comprising:
left and right side frames laterally spaced from each other and extending in a longitudinal direction of a vehicle body, each of the side frames including a rear frame extending along a rear part of the vehicle body;
a suspension unit including a shock absorber having an upper end connected to a respective one of the rear frames;
a cross member disposed above the suspension unit and interconnecting left and right rear fenders of the vehicle body;
a box member disposed between each of the rear frames and the cross member, the cross member being connected to each of the rear frames via the box member.

21. The vehicle rear body structure according to claim 20, wherein each of the rear frames has an arch-shaped portion bent upward and having an attachment portion disposed on an underside of the arch-shaped portion in vertical alignment with an apex of the arch-shaped portion for attachment of the upper end of the shock absorber.

22. The vehicle rear body structure according to claim 20, further comprising a partition wall configured to separate a passenger compartment and a tank chamber in which a fuel tank is disposed, the box member having a portion forming at least part of the partition wall.

23. The vehicle rear body structure according to claim 22, wherein the partition wall is connected to the cross member and the rear frames.

24. The vehicle rear body structure according to claim 22, further comprising a rear seat having a seatback frame, wherein the partition wall forms a part of the seatback frame.

* * * * *